United States Patent
Zhang et al.

(10) Patent No.: US 12,001,517 B2
(45) Date of Patent: Jun. 4, 2024

(54) POSITIONING METHOD AND APPARATUS

(71) Applicant: Huawei Technologies Co., Ltd., Shenzhen (CN)

(72) Inventors: Sunpei Zhang, Shenzhen (CN); Yuan Feng, Shanghai (CN); Wei Li, Shanghai (CN); Peng Zhou, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 206 days.

(21) Appl. No.: 17/489,085

(22) Filed: Sep. 29, 2021

(65) Prior Publication Data
US 2022/0019845 A1    Jan. 20, 2022

Related U.S. Application Data

(63) Continuation of application No. PCT/CN2019/081338, filed on Apr. 3, 2019.

(51) Int. Cl.
*G06F 18/23* (2023.01)

(52) U.S. Cl.
CPC .................. *G06F 18/23* (2023.01)

(58) Field of Classification Search
None
See application file for complete search history.

(56) References Cited

U.S. PATENT DOCUMENTS

| | | | | |
|---|---|---|---|---|
| 6,476,803 | B1* | 11/2002 | Zhang | G06T 17/005 |
| | | | | 345/582 |
| 10,783,698 | B2* | 9/2020 | Mishaev | H04N 19/597 |
| 11,624,827 | B2* | 4/2023 | Yu | G01C 21/26 |
| | | | | 701/461 |
| 2015/0088475 | A1 | 3/2015 | McKennon-Kelly et al. | |
| 2015/0146971 | A1* | 5/2015 | Robert | G06T 7/557 |
| | | | | 382/154 |
| 2018/0188038 | A1 | 7/2018 | Yang | |
| 2019/0009777 | A1* | 1/2019 | Cheng | G06T 7/246 |
| 2019/0179332 | A1* | 6/2019 | Cheng | G05D 1/0088 |
| 2019/0180467 | A1* | 6/2019 | Li | G01S 17/93 |
| 2020/0081119 | A1* | 3/2020 | Zhou | G01S 13/865 |
| 2020/0234071 | A1* | 7/2020 | Yuvaraj | G06T 7/73 |
| 2020/0410690 | A1* | 12/2020 | Zeng | G06F 18/2323 |

FOREIGN PATENT DOCUMENTS

| | | | | |
|---|---|---|---|---|
| CN | 106407947 | * | 2/2017 | ............ G06K 9/00 |
| CN | 107064955 A | | 8/2017 | |
| CN | 206691107 U | | 12/2017 | |
| CN | 107590836 A | | 1/2018 | |
| CN | 107610176 A | | 1/2018 | |

(Continued)

OTHER PUBLICATIONS

Dube, R., et al., "Incremental-Segmnent-Based Localization in 3-D Point Clouds," EE Robotics and Automation Letters. vol. 3, No. 3, Jul. 2018, 8 pages.

(Continued)

*Primary Examiner* — Andrew G Yang
(74) *Attorney, Agent, or Firm* — Conley Rose, P.C.

(57) ABSTRACT

A positioning method includes clustering points in a first point cloud through multi-clustering to obtain a target point cloud, where the target point cloud represents a feature of a target object, and the first point cloud includes the target point cloud and a point cloud that represents a feature of an interfering object; and determining a position of the target object based on the target point cloud.

23 Claims, 7 Drawing Sheets

---

301

A positioning apparatus clusters points in a first point cloud through multi-clustering to obtain a target point cloud

302

The positioning apparatus determines a position of a target object based on the target point cloud

(56) References Cited

FOREIGN PATENT DOCUMENTS

| CN | 108345007 | A | 7/2018 |
|---|---|---|---|
| CN | 108345823 | A | 7/2018 |
| CN | 108460416 | A | 8/2018 |
| CN | 108828621 | A | 11/2018 |
| CN | 108983248 | A | 12/2018 |
| CN | 109100741 | A | 12/2018 |
| CN | 109270543 | A | 1/2019 |
| CN | 109270544 | A | 1/2019 |
| WO | 2018161278 | A1 | 9/2018 |

OTHER PUBLICATIONS

Xu, S., et al., "An optimal hierarchical clustering approach to segmentation of mobile LiDAR point clouds," arxiv.org, Cornell University Library, 201 Olin Library Cornell University Ithaca, NY 14853, Nov. 9, 2017, 14 pages.

Hemmes, T., "Classification of Large Scale outdoor pointclouds using convolutional neural networks," Master of Science in Geomatics for the Built Environment, Apr. 30, 2018, 56 pages.

Yang, T. et al., "A Localization Method of Service Station Based on Repeated Grey Clustering and Its Application", Technology and Economy in Areas of Communications, vol. 17, No. 2, Apr. 2015, with an English abstract, 5 pages.

Shen, X, et al., "Efficient L-shape fitting of laser scanner data for vehicle pose estimation," [C]//Cybernetics and Intelligent Systems (CIS) and IEEE Conference on Robotics, Automation and Mechatronics (RAM). IEEE, 2015, 173-178, 6 pages.

Qi, C., et al. "Frustum pointnets for 3d object detection from rgb-d data," [J]. arXiv preprint arXiv:1711.08488, Apr. 13, 2018, 15 pages.

\* cited by examiner

POSITIONING METHOD AND APPARATUS

CROSS-REFERENCE TO RELATED APPLICATIONS

This application is a continuation of International Application No. PCT/CN2019/081338, filed on Apr. 3, 2019, the disclosure of which is hereby incorporated by reference in its entirety.

TECHNICAL FIELD

This application relates to the self-driving field in the artificial intelligence field, and in particular, to a positioning method and apparatus.

BACKGROUND

A self-driving technology relies on cooperation of computer vision, a radar, a monitoring apparatus, a global positioning system, and the like such that a motor vehicle can implement self-driving without an active manual operation. The self-driving often relies on a laser radar to accurately position obstacles such as an automobile, a pedestrian, and a bicycle. Currently, there are many vehicle positioning methods with relatively high precision. However, a current method for positioning the pedestrian and the bicycle cannot implement accurate or real-time recognition on a real object.

In recent years, a deep neural network method has achieved a high recognition rate comparable to that of human eye detection in the image recognition field. However, there are few methods with high accuracy for processing a point cloud that is obtained by a sensor such as a laser radar. In addition, deep learning requires a large amount of data for pre-training, has a high requirement on computing resources, takes long computing time, and does not meet a real-time requirement of a common vehicle-mounted system. Therefore, a non-neural network method is still used in many scenarios.

In the non-neural network method, clustering is used to position an obstacle. A point cloud is directly clustered or a point cloud is clustered with reference to a visual result, and then the obstacle is positioned based on a clustering result. This method works well on a large object such as the automobile. However, objects with fewer reflection points, such as the pedestrian and the bicycle, are very likely to be mistakenly detected or missing from detection. For example, a wall or a telegraph pole is clustered in a background. Therefore, it is necessary to study a method appropriate for positioning the objects with the fewer reflection points such as the pedestrian and the bicycle.

SUMMARY

Embodiments of this application provide a positioning method and apparatus, to extract a point cloud that represents a feature of a target object through multi-clustering, achieving accurate and highly real-time positioning of the target object to avoid the target object.

According to a first aspect, an embodiment of this application provides a positioning method. The method includes clustering points in a first point cloud through multi-clustering to obtain a target point cloud, where the target point cloud is a point cloud that represents a feature of a target object, and the first point cloud includes the target point cloud and a point cloud that represents a feature of an interfering object; and determining a position of the target object based on the target point cloud.

In this embodiment of this application, the point cloud that represents the feature of the target object can be accurately extracted from the first point cloud using a multi-clustering method, to help avoid the target object.

In an optional implementation, the clustering points in a first point cloud through multi-clustering to obtain a target point cloud includes clustering the points in the first point cloud to obtain a second point cloud, where the second point cloud is a point cloud that has the highest probability of belonging to the target point cloud and that is in a plurality of point clouds obtained by clustering the points in the first point cloud; and when the second point cloud is not the target point cloud, clustering points in a third point cloud at least once to obtain the target point cloud, where the third point cloud is a point cloud other than the second point cloud in the first point cloud.

In this implementation, any clustering method may be used to cluster the first point cloud, and any manner is used to select, from the plurality of point clouds obtained through clustering, the point cloud that has the highest probability of belonging to the target point cloud. In this implementation, when the point cloud obtained through clustering is not the target point cloud, one or more times of clustering are performed again to obtain the target point cloud. This can effectively avoid a problem that the point cloud obtained through one-time clustering is not the target point cloud.

In an optional implementation, the clustering points in a third point cloud at least once to obtain the target point cloud includes clustering the points in the third point cloud to obtain a fourth point cloud, where the fourth point cloud is a point cloud that has the highest probability of belonging to the target point cloud and that is in a plurality of point clouds obtained by clustering the points in the third point cloud; and when the fourth point cloud is not the target point cloud, a quantity of clustering operations is less than a first threshold, and a quantity of points in a fifth point cloud is not less than a second threshold, clustering points in the fifth point cloud at least once to obtain the target point cloud, where the fifth point cloud is a point cloud other than the fourth point cloud in the third point cloud.

When the quantity of clustering operations is not less than the first threshold, or the quantity of points in the fifth point clouds is less than the second threshold, it may be considered that the target object cannot be positioned using the current point cloud. In this way, the clustering operation may be stopped. That the fourth point cloud is not the target point cloud, the quantity of clustering operations is less than the first threshold, or the quantity of points in the fifth point cloud is not less than the second threshold is an optional condition for continuing to perform the clustering operation provided in this application. It should be understood that the clustering operation may continue to be performed when the fourth point cloud is not the target point cloud and the fifth point cloud meets a specific condition. A condition that needs to be met for clustering the fifth point cloud is not limited in this application. In this implementation, when the fifth point cloud meets a minimum requirement for clustering, the fifth point cloud is clustered to extract the target point cloud, to reduce an unnecessary operation.

In an optional implementation, before the clustering points in a third point cloud at least once to obtain the target point cloud, the method further includes extracting points other than the second point cloud in the first point cloud to obtain the third point cloud.

In this implementation, the points other than the second point cloud in the first point cloud are extracted to obtain the third point cloud, to reduce search space of the target point cloud, and reduce an operation amount of the clustering operation.

In an optional implementation, the clustering the points in the first point cloud to obtain a second point cloud includes determining a clustering parameter based on distribution of the first point cloud; and clustering the points in the first point cloud using the clustering parameter, to obtain the second point cloud.

In this implementation, the point cloud is clustered using the corresponding clustering parameter based on the distribution of the point cloud, to improve clustering accuracy.

In an optional implementation, the clustering parameter is at least one of a neighborhood and a minimum quantity of points.

In an optional implementation, before the clustering points in a first point cloud through multi-clustering to obtain a target point cloud, the method further includes extracting the first point cloud from an original point cloud, where each point in the original point cloud corresponds to one pixel in an original image, pixels in the original image corresponding to the points in the first point cloud are within a target boundary of the original image, pixels in the original image, corresponding to points other than the first point cloud in the original point cloud are not within the target boundary, and an image of the target object is within the target boundary.

In this implementation, the first point cloud including the target point cloud is extracted from the original point cloud, to reduce the search space of the target point cloud, and reduce the operation amount of the clustering operation.

In an optional implementation, the extracting the first point cloud from an original point cloud includes determining the target boundary in the original image; and extracting the first point cloud from the original point cloud based on the target boundary.

Each point in the original point cloud corresponds to one pixel in the original image, and the image of the target object is within the target boundary. Therefore, pixels in the original image corresponding to the point cloud that represents the feature of the target object and that is in the original point cloud are within the target boundary. In this implementation, the point cloud corresponding to the target object can be accurately extracted using the target boundary in the original image, and implementation is simple.

In an optional implementation, a case in which the second point cloud is not the target point cloud may include A Euclidean distance or a one-norm between any points in a plurality of points obtained through vertical projection of the second point cloud is less than a third threshold, or a height difference between the highest point and the lowest point that are in the second point cloud is less than a fourth threshold.

In this implementation, whether the second point cloud is the target point cloud can be quickly and accurately determined.

According to a second aspect, an embodiment of this application provides a self-driving method. The method includes receiving, by a cloud server, driving information from a self-driving apparatus, where the driving information includes a first point cloud, and the first point cloud includes a target point cloud that represents a feature of a target object and a point cloud that represents a feature of an interfering object; clustering points in the first point cloud through multi-clustering to obtain the target point cloud; determining a position of the target object based on the target point cloud; determining, by the cloud server based on the position of the target object, a target driving operation that needs to be performed by the self-driving apparatus; and sending, by the cloud server, a control instruction to the self-driving apparatus, where the control instruction is used to instruct the self-driving apparatus to perform the target driving operation.

In this embodiment of this application, a processing capability and a data storage capability of the cloud server are far beyond those of the self-driving apparatus. The cloud server may fully use a processing resource and a storage resource of the cloud server to provide a self-driving service for one or more self-driving apparatuses. In addition, the self-driving apparatus does not need to determine, by the self-driving apparatus, the driving operation that needs to be performed. Therefore, workload is comparatively small.

In an optional implementation, the clustering points in a first point cloud through multi-clustering to obtain a target point cloud includes clustering the points in the first point cloud to obtain a second point cloud, where the second point cloud is a point cloud that has the highest probability of belonging to the target point cloud and that is in a plurality of point clouds obtained by clustering the points in the first point cloud; and when the second point cloud is not the target point cloud, clustering points in a third point cloud at least once to obtain the target point cloud, where the third point cloud is a point cloud other than the second point cloud in the first point cloud.

In an optional implementation, the clustering points in a third point cloud at least once to obtain the target point cloud includes clustering the points in the third point cloud to obtain a fourth point cloud, where the fourth point cloud is a point cloud that has the highest probability of belonging to the target point cloud and that is in a plurality of point clouds obtained by clustering the points in the third point cloud; and when the fourth point cloud is not the target point cloud, a quantity of clustering operations is less than a first threshold, and a quantity of points in a fifth point cloud is not less than a second threshold, clustering points in the fifth point cloud at least once to obtain the target point cloud, where the fifth point cloud is a point cloud other than the fourth point cloud in the third point cloud.

In an optional implementation, before the clustering points in a third point cloud at least once to obtain the target point cloud, the method further includes extracting points other than the second point cloud in the first point cloud to obtain the third point cloud.

In this implementation, the points other than the second point cloud in the first point cloud are extracted to obtain the third point cloud, to reduce search space of the target point cloud, and reduce an operation amount of a clustering operation.

In an optional implementation, the clustering the points in the first point cloud to obtain a second point cloud includes determining a clustering parameter based on distribution of the first point cloud; and clustering the points in the first point cloud using the clustering parameter, to obtain the second point cloud.

In this implementation, the point cloud is clustered using the corresponding clustering parameter based on the distribution of the point cloud, to improve clustering accuracy.

In an optional implementation, the clustering parameter is at least one of a neighborhood and a minimum quantity of points.

In an optional implementation, before the clustering points in a first point cloud through multi-clustering to obtain a target point cloud, the method further includes extracting the first point cloud from an original point cloud, where each point in the original point cloud corresponds to one pixel in an original image, pixels in the original image corresponding to the points in the first point cloud are within a target boundary of the original image, pixels in the original image corresponding to points other than the first point cloud in the original point cloud are not within the target boundary, and an image of the target object is within the target boundary.

In this implementation, the first point cloud including the target point cloud is extracted from the original point cloud, to reduce the search space of the target point cloud, and reduce the operation amount of the clustering operation.

In an optional implementation, the extracting the first point cloud from an original point cloud includes determining the target boundary in the original image; and extracting the first point cloud from the original point cloud based on the target boundary.

In this implementation, the point cloud corresponding to the target object can be accurately extracted using the target boundary in the original image, and implementation is simple.

In an optional implementation, a case in which the second point cloud is not the target point cloud may include a Euclidean distance or a one-norm between any points in a plurality of points obtained through vertical projection of the second point cloud that is less than a third threshold, or a height difference between the highest point and the lowest point that are in the second point cloud that is less than a fourth threshold.

According to a third aspect, an embodiment of this application provides a positioning apparatus. The positioning apparatus includes a clustering unit configured to cluster points in a first point cloud through multi-clustering to obtain a target point cloud, where the target point cloud is a point cloud that represents a feature of a target object, and the first point cloud includes the target point cloud and a point cloud that represents a feature of an interfering object; and a positioning unit configured to determine a position of the target object based on the target point cloud.

In an optional implementation, the clustering unit is configured to cluster the points in the first point cloud to obtain a second point cloud, where the second point cloud is a point cloud that has the highest probability of belonging to the target point cloud and that is in a plurality of point clouds obtained by clustering the points in the first point cloud; and when the second point cloud is not the target point cloud, cluster points in a third point cloud at least once to obtain the target point cloud, where the third point cloud is a point cloud other than the second point cloud in the first point cloud.

In an optional implementation, the clustering unit is configured to cluster the points in the third point cloud to obtain a fourth point cloud, where the fourth point cloud is a point cloud that has the highest probability of belonging to the target point cloud and that is in a plurality of point clouds obtained by clustering the points in the third point cloud; and when the fourth point cloud is not the target point cloud, a quantity of clustering operations is less than a first threshold, and a quantity of points in a fifth point cloud is not less than a second threshold, cluster points in the fifth point cloud at least once to obtain the target point cloud, where the fifth point cloud is a point cloud other than the fourth point cloud in the third point cloud.

In an optional implementation, the apparatus further includes a first extraction unit configured to extract points other than the second point cloud in the first point cloud to obtain the third point cloud.

In an optional implementation, the clustering unit is configured to determine a clustering parameter based on distribution of the first point cloud; and cluster the points in the first point cloud using the clustering parameter, to obtain the second point cloud.

In an optional implementation, the clustering parameter is at least one of a neighborhood and a minimum quantity of points.

In an optional implementation, the apparatus further includes a second extraction unit configured to extract the first point cloud from an original point cloud, where each point in the original point cloud corresponds to one pixel in an original image, pixels in the original image corresponding to the points in the first point cloud are within a target boundary of the original image, pixels in the original image corresponding to points other than the first point cloud in the original point cloud are not within the target boundary, and an image of the target object is within the target boundary.

In an optional implementation, the second extraction unit is configured to determine the target boundary in the original image; and extract the first point cloud from the original point cloud based on the target boundary.

According to a fourth aspect, an embodiment of this application provides a cloud server. The cloud server includes a transceiver configured to receive driving information from a self-driving apparatus, where the driving information includes a first point cloud, and the first point cloud includes a target point cloud that represents a feature of a target object and a point cloud that represents a feature of an interfering object; and a processor configured to cluster points in the first point cloud through multi-clustering to obtain the target point cloud. The processor is further configured to determine a position of the target object based on the target point cloud; and determine, based on the position of the target object, a target driving operation that needs to be performed by the self-driving apparatus. The transceiver is further configured to send a control instruction to the self-driving apparatus. The control instruction is used to instruct the self-driving apparatus to perform the target driving operation.

According to a fifth aspect, an embodiment of this application provides a computer-readable storage medium. The computer storage medium stores a computer program. The computer program includes program instructions. When the program instructions are executed by a processor, the processor is enabled to perform the method according to any one of the first aspect, the second aspect, and the optional implementations.

According to a sixth aspect, an embodiment of this application provides a computer program product. The computer program product includes program instructions. When the program instructions are executed by a processor, the processor is enabled to perform the method according to any one of the first aspect, the second aspect, and the optional implementations.

According to a seventh aspect, an embodiment of this application provides a positioning apparatus including a memory and a processor. The memory is configured to store program instructions. The processor is configured to execute the program instructions, to perform the method according to any one of the first aspect, the second aspect, and the optional implementations.

DESCRIPTION OF EMBODIMENTS

Figure 1:
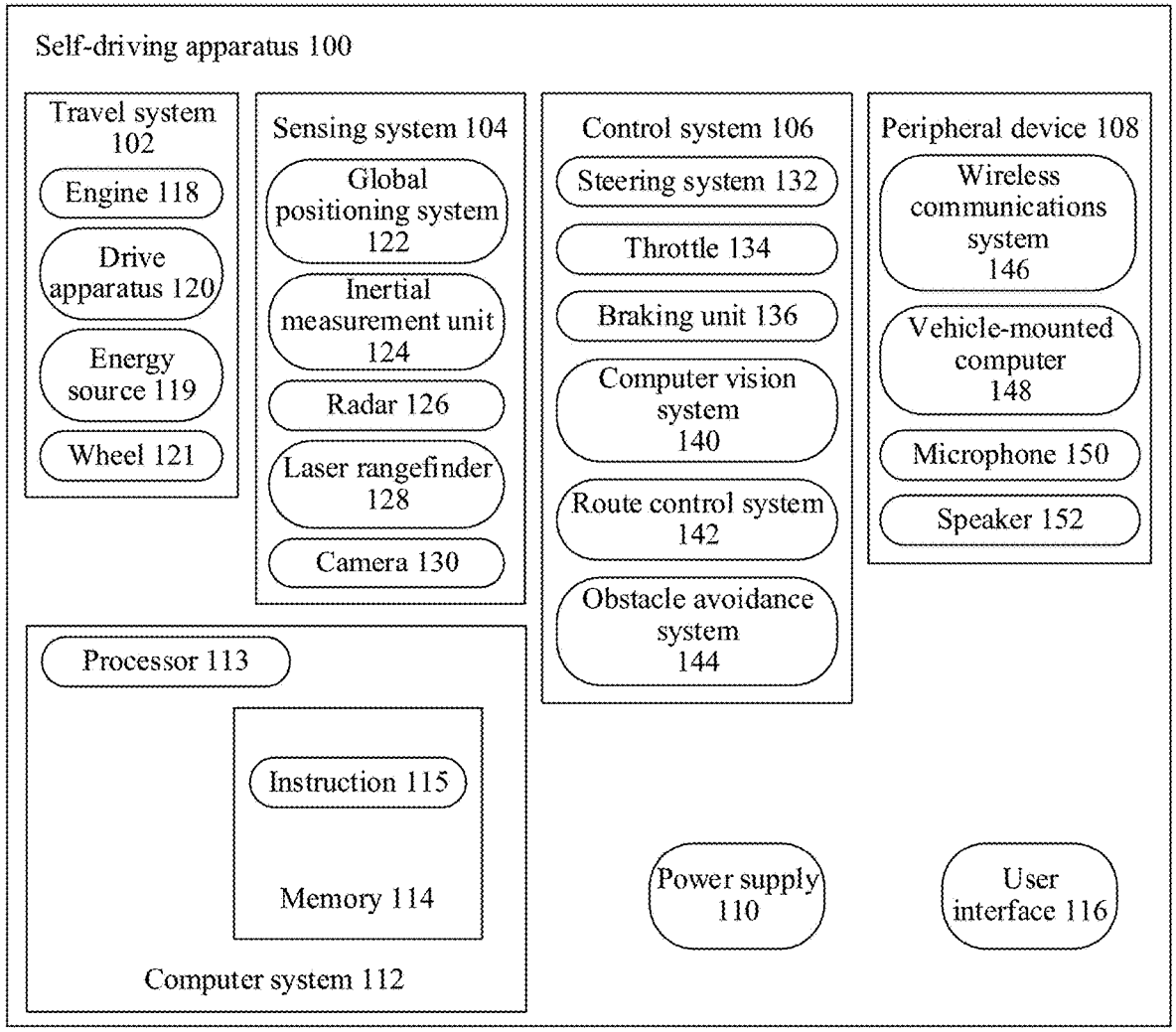
FIG. 1 is a functional block diagram of a self-driving apparatus according to an embodiment of this application.

To help a person skilled in the art understand the technical solutions in embodiments of this application better, the following clearly describes the technical solutions in the embodiments of this application with reference to the accompanying drawings in the embodiments of this application. It is clear that the described embodiments are merely some rather than all of the embodiments of this application.

In the embodiments, claims, and accompanying drawings of the specification of this application, terms such as "first", "second", and "third" are intended to distinguish between similar objects but do not necessarily indicate a specific order or sequence. In addition, the terms "include", "have", and any variant thereof are intended to cover the non-exclusive inclusion, for example, include a series of steps or units. A method, system, product, or device is not necessarily limited to those steps or units that are clearly listed, but may include other steps or units that are not clearly listed or inherent to such a process, method, product, or device.

A self-driving apparatus needs to accurately position obstacles such as an automobile, a pedestrian, and a bicycle, to avoid the obstacles in order to implement safe driving. Currently, a commonly used method for positioning the obstacles such as the automobile, the pedestrian, and the bicycle is as follows. A reference point cloud of each obstacle is extracted from an original point cloud collected by a laser radar. The reference point cloud of each obstacle includes a point cloud of each obstacle and a point cloud of an interfering object. The reference point cloud of each obstacle is clustered to obtain a point cloud of each obstacle. Each obstacle is positioned based on the point cloud of the obstacle. Because the point cloud of the obstacle, extracted from the original point cloud usually includes the point cloud of the interfering object, the point cloud extracted from the original point cloud needs to be clustered to extract the point cloud of each obstacle. In a currently used clustering method, the point cloud extracted from the original point cloud is clustered only once, a point cloud obtained through clustering is used as a point cloud of an obstacle, and the obstacle is positioned based on the point cloud of the obstacle. However, for obstacles such as a bicycle and a pedestrian that have relatively few reflection points, it is difficult to accurately extract point clouds of these obstacles using one clustering operation. Consequently, the obstacles cannot be accurately positioned. Therefore, it is necessary to study a clustering method that can be used to extract a point cloud of each obstacle accurately. The positioning method provided in the embodiments of this application may be applied to a self-driving scenario. The following briefly describes the self-driving scenario.

In the self-driving scenario, a self-driving apparatus (for example, a self-driving car) uses a laser radar to collect a point cloud of an ambient environment in real time or near-real time, and uses a camera to collect an image. The obtained point cloud and image are used to position an obstacle. A corresponding driving policy is performed based on a position of the obstacle, to avoid the obstacle.

FIG. 1 is a functional block diagram of a self-driving apparatus 100 according to an embodiment of this application. In an embodiment, the self-driving apparatus 100 is configured to be in a full or partial self-driving mode. For example, the self-driving apparatus 100 may control the self-driving apparatus 100 in the self-driving mode, determine a status of the self-driving apparatus 100 and a status of an ambient environment of the self-driving apparatus 100 through a manual operation, determine possible behavior of at least one other automobile in the ambient environment, determine a confidence level corresponding to a possibility of performing the possible behavior by the other vehicle, and control the self-driving apparatus 100 based on the determined information. When the self-driving apparatus 100 is in the self-driving mode, it may be set that the self-driving apparatus 100 operates in a case of not interacting with a person.

The self-driving apparatus 100 may include various subsystems, for example, a travel system 102, a sensor system 104, a control system 106, one or more peripheral devices 108, a power supply 110, a computer system 112, and a user interface 116. Optionally, the self-driving apparatus 100 may include more or fewer subsystems, and each subsystem may include a plurality of elements. In addition, the subsystems and the elements of the self-driving apparatus 100 may be all interconnected in a wired or wireless manner.

The travel system 102 may include components that power the self-driving apparatus 100. In an embodiment, the propulsion system 102 may include an engine 118, an energy source 119, a drive apparatus 120, and a wheel/tire 121. The engine 118 may be an internal combustion engine, an electric motor, an air compression engine, or a combination of other types of engines, for example, a hybrid engine formed by a gasoline engine and an electric motor, or a hybrid engine formed by an internal combustion engine and an air compression engine. The engine 118 converts the energy source 119 into mechanical energy.

Examples of the energy source 119 include gasoline, diesel, other oil-based fuels, propane, other compressed-gas-based fuels, ethanol, solar panels, batteries, and other power sources. The energy source 119 may further provide energy for another system of the self-driving apparatus 100.

The drive apparatus 120 can transfer mechanical power from the engine 118 to the wheel 121. The drive apparatus 120 may include a gearbox, a differential, and a drive shaft. In an embodiment, the drive apparatus 120 may further include another component, for example, a clutch. The drive shaft may include one or more shafts that may be coupled to one or more wheels 121.

The sensor system 104 may include several sensors that sense information about an ambient environment of the self-driving apparatus 100. For example, the sensor system 104 may include a positioning system 122 (for example, a Global Positioning System (GPS), or a BeiDou® system or another positioning system), an inertial measurement unit (IMU) 124, radar 126, a laser rangefinder 128, and a camera 130. The sensor system 104 may further include a sensor that monitors an internal system of the self-driving apparatus 100 (for example, an in-vehicle air quality monitor, a fuel gauge, or an oil temperature gauge). One or more pieces of sensor data from these sensors can be used to detect objects and corresponding features (a position, a shape, a direction, a speed, and the like) of the objects. Detection and recognition are key functions for implementing a secure operation by the self-driving apparatus 100.

The positioning system 122 can be configured to estimate a geographical position of the self-driving apparatus 100. The IMU 124 is configured to sense a position and an orientation change of the self-driving apparatus 100 based on inertial acceleration. In an embodiment, the IMU 124 may be a combination of an accelerometer and a gyroscope.

The radar 126 may sense an object in the ambient environment of the self-driving apparatus 100 using a radio signal.

The laser rangefinder 128 may use a laser to sense an object in an environment in which the self-driving apparatus 100 is located. In some embodiments, the laser rangefinder 128 may include one or more laser sources, a laser scanner, one or more detectors, and other system components. In some embodiments, in addition to sensing an object, the laser rangefinder 128 may be a laser radar (light detection and ranging (LiDAR)). The laser radar is a radar system that detects a feature quantity such as a position and a speed of a target by emitting a laser beam. The laser radar can transmit detection signals (laser beams) to the target (namely, an obstacle) or in a direction, and then compare received signals (target echoes) reflected from the target with the transmitted signals. After appropriate processing is performed, information about the target can be obtained, for example, a point cloud that represents a surface feature of the target. A point cloud is a set of massive points that represent target spatial distribution and a target surface feature in a same spatial reference system. The point cloud in this application may be a point cloud obtained according to a laser measurement principle, and includes three-dimensional coordinates of each point.

The camera 130 can be configured to capture a plurality of images of the ambient environment of the self-driving apparatus 100. The camera 130 may be a static camera or a video camera. The camera 130 may capture the plurality of images of the ambient environment of the self-driving apparatus 100 in real time or periodically.

The control system 106 controls operations of the self-driving apparatus 100 and components of the self-driving apparatus 100. The control system 106 may include various elements, including a steering system 132, a throttle 134, a braking unit 136, a computer vision system 140, a route control system 142, and an obstacle avoidance system 144.

The steering system 132 is operable to adjust a forward direction of the self-driving apparatus 100. For example, in an embodiment, the steering system 132 may be a steering wheel system.

The throttle 134 is configured to control an operating speed of the engine 118 and further control a speed of the self-driving apparatus 100.

The braking unit 136 is configured to control the self-driving apparatus 100 to decelerate. The braking unit 136 may use friction to slow down a rotational speed of the wheel 121. In another embodiment, the braking unit 136 may convert kinetic energy of the wheel 121 into a current. The braking unit 136 may alternatively use another form to reduce a rotational speed of the wheel 121 in order to control the speed of the self-driving apparatus 100.

The computer vision system 140 may operate to process and analyze an image captured by the camera 130 in order to recognize objects and/or features in the ambient environment of the self-driving apparatus 100. The objects and/or features may include traffic signals, road boundaries, and obstacles. The computer vision system 140 may use an object recognition algorithm, a self-driving method, a structure from motion (Structure from Motion, SFM) algorithm, video tracking, and other computer vision technologies. In some embodiments, the computer vision system 140 may be configured to draw a map for an environment, track an object, estimate a speed of an object, and the like. The computer vision system 140 may use the point cloud obtained by the laser radar and the image of the ambient environment obtained by the camera to position an obstacle.

The route control system 142 is configured to determine a driving route of the self-driving apparatus 100. In some embodiments, the route control system 142 may determine the driving route for the self-driving apparatus 100 with reference to data from the sensor 138, the GPS 122, and one or more predetermined maps.

The obstacle avoidance system 144 is configured to identify, evaluate, and avoid or otherwise bypass a potential obstacle in an environment of the self-driving apparatus 100.

Certainly, in an instance, the control system 106 may add or alternatively include components other than those shown and described. Alternatively, some of the components shown above may be removed.

The self-driving apparatus 100 interacts with an external sensor, another vehicle, another computer system, or a user using the peripheral device 108. The peripheral device 108 may include a wireless communications system 146, a vehicle-mounted computer 148, a microphone 150, and/or a speaker 152.

In some embodiments, the peripheral device 108 provides a means for a user of the self-driving apparatus 100 to interact with the user interface 116. For example, the vehicle-mounted computer 148 may provide information for the user of the self-driving apparatus 100. The user interface 116 may be further used to operate the vehicle-mounted computer 148 to receive user input. The vehicle-mounted computer 148 may perform an operation through a touchscreen. In other cases, the peripheral device 108 may provide a means used by the self-driving apparatus 100 to communicate with another device located in a vehicle. For example, the microphone 150 may receive audio (for example, a voice command or another audio input) from the user of the self-driving apparatus 100. Likewise, the speaker 152 may output audio to the user of the self-driving apparatus 100.

The wireless communications system 146 may communicate wirelessly with one or more devices directly or through a communications network. For example, the wireless communications system 146 may use third generation (3G) cellular communication, fourth generation (4G) cellular communication such as Long-Term Evolution (LTE), or fifth generation (5G) cellular communication. The wireless communications system 146 may communicate with a wireless local area network (WLAN) using Wi-Fi®. In some embodiments, the wireless communications system 146 may communicate directly with a device through an infrared link, Bluetooth®, or ZigBee®. Other wireless protocols, for example, various vehicle communications systems, such as the wireless communications system 146, may include one or more dedicated short range communications (DSRC) devices, and these devices may include public and/or private data communication between the vehicle and/or roadside stations.

The power supply 110 may supply power to the components of the self-driving apparatus 100. In an embodiment, the power supply 110 may be a rechargeable lithium-ion or lead-acid battery. One or more battery packs of such a battery may be configured as a power supply to supply power to the components of the self-driving apparatus 100. In some embodiments, the power supply 110 and the energy source 119 may be implemented together, as in some pure electric vehicles.

Some or all functions of the self-driving apparatus 100 are controlled by the computer system 112. The computer system 112 may include at least one processor 113. The processor 113 executes an instruction 115 stored in a non-transitory computer-readable medium such as a data storage apparatus 114. The computer system 112 may alternatively be a plurality of computing devices that control individual components or subsystems of the self-driving apparatus 100 in a distributed manner.

The processor 113 may be any conventional processor, such as a commercially available central processing unit (CPU). Alternatively, the processor may be a dedicated device such as an application-specific integrated circuit (ASIC) or another hardware-based processor. Although FIG. 1 functionally illustrates other elements of the processor, the memory, and the computer system 112 in a same block, a person of ordinary skill in the art should understand that the processor, the computer, or the memory may include a plurality of processors, computers, or memories that may or may not be stored in a same physical housing. For example, the memory may be a hard disk drive or another storage medium located in a housing different from that of the computer system 112. Thus, it is understood that references to the processor or the computer include references to a set of processors or computers or memories that may or may not operate in parallel. Different from using a single processor to perform the steps described herein, some components such as a steering component and a deceleration component may each include a respective processor. The processor performs only computation related to component-specific functions.

In the aspects described herein, the processor may be located far away from the self-driving apparatus and perform wireless communication with the self-driving apparatus. In other aspects, some operations in a process described herein are performed on the processor disposed in the self-driving apparatus, and other operations are performed by a remote processor, including performing necessary steps for performing a single operation.

In some embodiments, the data storage apparatus 114 may include an instruction 115 (for example, program logic), and the instruction 115 may be executed by the processor 113 to perform various functions of the self-driving apparatus 100, including those functions described above. The data storage apparatus 114 may also include additional instructions, including instructions to send data to, receive data from, interact with, and/or control one or more of the propulsion system 102, the sensor system 104, the control system 106, and the peripheral device 108.

In addition to the instruction 115, the data storage apparatus 114 may further store data, such as a road map, route information, and a position, a direction, a speed, and other information of a vehicle. Such information may be used by the self-driving apparatus 100 and the computer system 112 when the self-driving apparatus 100 operates in an autonomous mode, a semi-autonomous mode, and/or a manual mode.

The user interface 116 is configured to provide information for or receive information from the user of the self-driving apparatus 100. Optionally, the user interface 116 may include one or more input/output devices in a set of peripheral devices 108, for example, the wireless communications system 146, the vehicle-mounted computer 148, the microphone 150, and the speaker 152.

The computer system 112 may control functions of the self-driving apparatus 100 based on input received from each of the subsystems (for example, the travel system 102, the sensor system 104, and the control system 106) and from the user interface 116. For example, the computer system 112 may use input from the control system 106 to control the steering unit 132 to avoid an obstacle detected by the sensor system 104 and the obstacle avoidance system 144. In some embodiments, the computer system 112 is operable to provide control over many aspects of the self-driving apparatus 100 and the subsystems of the self-driving apparatus 100.

Optionally, one or more of the foregoing components may be installed separately from or associated with the self-driving apparatus 100. For example, the data storage apparatus 114 may be partially or completely separated from the self-driving apparatus 100. The foregoing components may be communicatively coupled together in a wired and/or wireless manner.

Optionally, the foregoing components are merely examples. In an application, components in the foregoing modules may be added or removed based on requirements. FIG. 1 should not be understood as a limitation to this embodiment of this application.

A self-driving car traveling on a road, such as the foregoing self-driving apparatus 100, may recognize an object in an ambient environment of the self-driving apparatus 100 to determine adjustment on a current speed. The object may be another vehicle, a traffic control device, or another type of object. In some examples, each recognized object may be considered independently and may be used to determine the speed to be adjusted by the self-driving car, based on features of each object, such as a current speed of the object, acceleration of the object, or a spacing between the object and the car.

Optionally, the self-driving apparatus 100 or a computing device (for example, the computer system 112, the computer vision system 140, and the data storage apparatus 114 in FIG. 1) associated with the self-driving apparatus 100 may predict behavior of the recognized object based on features of the recognized object and a status of the ambient environment (for example, traffic, rain, or ice on a road). Optionally, recognized objects depend on behavior of each other. Therefore, all recognized objects may be considered together to predict behavior of a single recognized object. The self-driving apparatus 100 can adjust the speed of the self-driving apparatus 100 based on the predicted behavior of the recognized object. In other words, the self-driving vehicle can determine, based on the predicted behavior of the object, a specific stable state to which the vehicle needs to be adjusted (for example, acceleration, deceleration, or stop). In this process, another factor may also be considered to determine the speed of the self-driving apparatus 100, for example, a horizontal position of the self-driving apparatus 100 on a road on which the self-driving apparatus 100 travels, a curvature of the road, and proximity between a static object and a dynamic object.

In addition to providing an instruction for adjusting the speed of the self-driving car, the computing device may further provide an instruction for modifying a steering angle of the self-driving apparatus 100 such that the self-driving car can follow a given track and/or maintain safe horizontal and vertical distances from objects (for example, a car on a neighboring lane of the road) near the self-driving car.

The self-driving apparatus 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not limited in this embodiment of the present disclosure.

Figure 2:
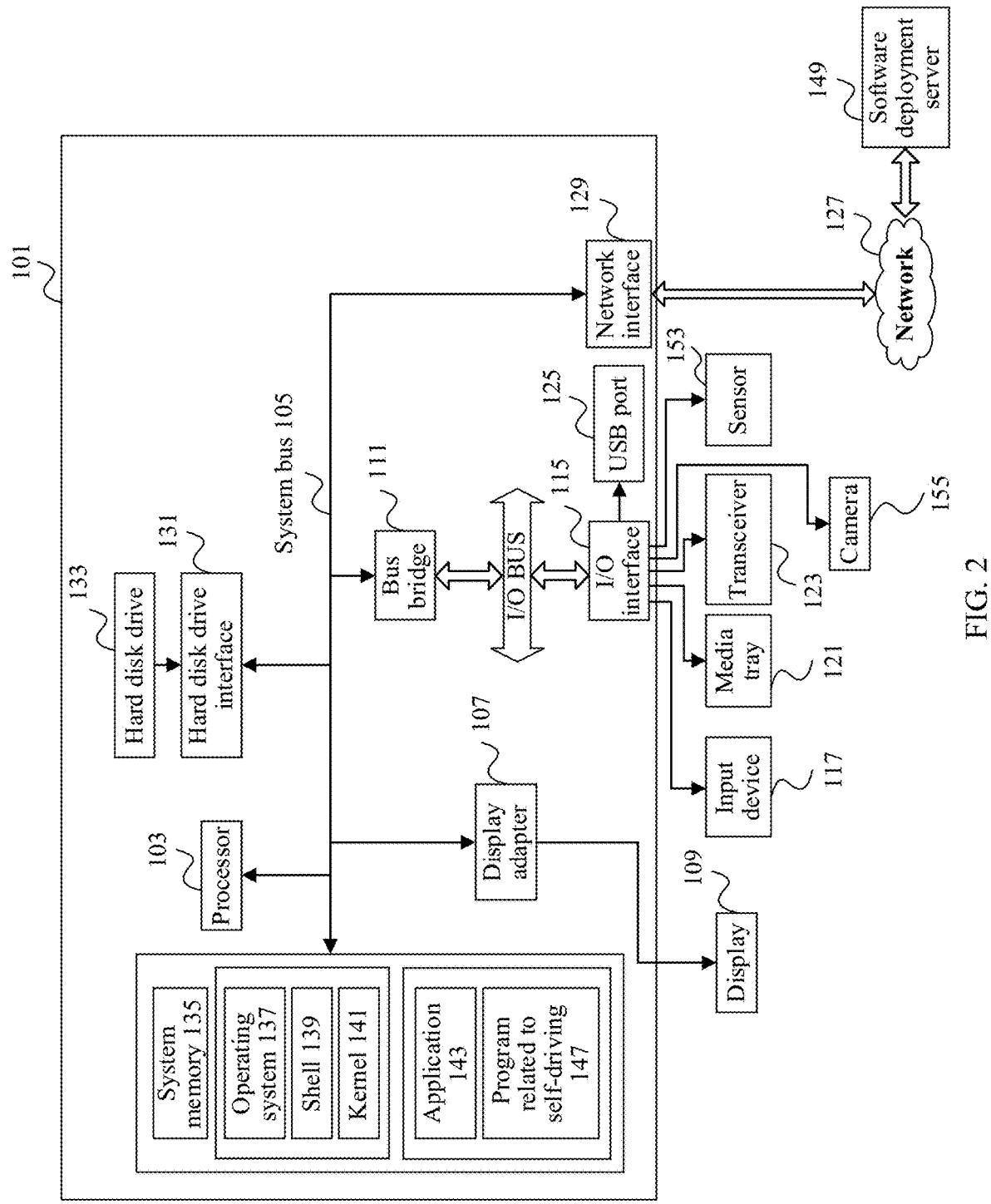
FIG. 2 is a schematic diagram of a structure of a self-driving system according to an embodiment of this application.

FIG. 1 is the functional block diagram of the self-driving apparatus 100, and the following describes a self-driving system 101. FIG. 2 is a schematic diagram of a structure of the self-driving system according to an embodiment of this application. In FIG. 1 and FIG. 2, the self-driving apparatus 100 is described from different perspectives. As shown in FIG. 2, the computer system 101 includes a processor 103, and the processor 103 is coupled to a system bus 105. The processor 103 may be one or more processors, and each processor may include one or more processor cores. A display adapter (video adapter) 107 may drive a display 109, and the display 109 is coupled to the system bus 105. The system bus 105 is coupled to an input/output (I/O) bus 113 through a bus bridge 111. An I/O interface 115 is coupled to the I/O bus. The I/O interface 115 communicates with a plurality of I/O devices, such as an input device 117 (such as a keyboard, a mouse, or a touchscreen), a multimedia compact disc (media tray) 121, such as a CD-ROM or a multimedia interface. The self-driving system further includes a transceiver 123 (which may send and/or receive a radio communication signal), a camera 155 (which may capture a scenery and a dynamic digital video image), and an external USB interface 125. Optionally, an interface connected to the I/O interface 115 may be a USB interface.

The processor 103 may be any conventional processor, including a reduced instruction set computing (RISC) processor, a complex instruction set computing (CISC) processor, or a combination thereof. Optionally, the processor may be a dedicated apparatus such as an ASIC. Optionally, the processor 103 may be a neural-network processing unit (NPU) or a combination of a neural-network processing unit and the foregoing conventional processor. Optionally, a neural-network processing unit is disposed on the processor 103.

The computer system 101 may communicate with a software deployment server 149 through a network interface 129. The network interface 129 is a hardware network interface, for example, a network interface card. A network 127 may be an external network, such as the internet, or may be an internal network, such as the Ethernet or a virtual private network. Optionally, the network 127 may alternatively be a wireless network, for example, a Wi-Fi network or a cellular network.

A hard disk drive interface is coupled to the system bus 105. A hardware driver interface is connected to a hard disk drive. A system memory 135 is coupled to the system bus 105. Data running in the system memory 135 may include an operating system 137 and an application 143 of the computer system 101.

The operating system includes a shell (Shell) 139 and a kernel (kernel) 141. The shell 139 is an interface between a user and the kernel (kernel) of the operating system. The shell 139 is the outermost layer of the operating system. The shell 139 manages interaction between the user and the operating system such as waiting for input of the user, explaining the input of the user to the operating system, and processing output results of various operating systems.

The kernel 141 includes components of the operating system that are configured to manage a memory, a file, a peripheral, and a system resource. The kernel 141 directly interacts with hardware. The kernel of the operating system usually runs processes, provides inter-process communication, and provides CPU time slice management, interruption, memory management, I/O management, and the like.

The application 141 includes a self-driving-related program, for example, a program for managing interaction between a self-driving apparatus and an obstacle on a road, a program for controlling a driving route or speed of a self-driving apparatus, or a program for controlling interaction between a self-driving apparatus 100 and another self-driving apparatus on the road. The application 141 also exists on a system of the software deployment server (deploying server) 149. In an embodiment, when the application 141 needs to be executed, the computer system 101 may download the application 141 from the software deployment server 149.

A sensor 153 is associated with the computer system 101. The sensor 153 is configured to detect an ambient environment of the computer system 101. For example, the sensor 153 may detect an animal, an automobile, an obstacle, a pedestrian crosswalk, or the like. Further, the sensor may detect an ambient environment of the foregoing object such as the animal, the automobile, the obstacle, or the pedestrian crosswalk. For example, the sensor may detect an ambient environment of the animal such as another animal, a weather condition, and brightness of the ambient environment that appear around the animal. Optionally, if the computer system 101 is located on a self-driving apparatus, the sensor may be a camera (namely, a camera), a laser radar, an infrared sensor, a chemical detector, a microphone, or the like. When being activated, the sensor 153 senses information at preset intervals, and provides the sensed information for the computer system 101 in real time or near-real time. Optionally, the sensor may include a laser radar. The laser radar may provide the obtained point cloud for the computer system 101 in real time or near-real time. To be specific, a series of obtained point clouds are provided for the computer system 101. A point cloud obtained each time corresponds to one time stamp. Optionally, the camera provides an obtained image for the computer system 101 in real time or near-real time, and each frame of image corresponds to one time stamp. It should be understood that the computer system 101 may obtain an image sequence from the camera.

Optionally, in the embodiments described in this specification, the computer system 101 may be located far away from the self-driving apparatus, and may perform wireless communication with the self-driving apparatus. The transceiver 123 may send a self-driving task, the sensor data collected by the sensor 153, and other data to the computer system 101, and may further receive a control instruction sent by the computer system 101. The self-driving apparatus may execute the control instruction received by the transceiver from the computer system 101, and perform a corresponding driving operation. In other aspects, some of the processes described in this specification are performed on a processor disposed inside a self-driving vehicle, and others are performed by a remote processor, including taking actions required to perform a single operation.

In a self-driving process, the self-driving apparatus needs to determine positions of an automobile, a pedestrian, or another obstacle in the ambient environment in a timely manner, and then perform a corresponding driving operation to avoid the automobile, the pedestrian, or the other obstacle in the ambient environment. In an application, the self-driving apparatus may position the automobile, the pedestrian, or the other obstacle in the ambient environment based on a point cloud and an image that are collected by the self-driving apparatus. The self-driving apparatus may further send driving information (including the point cloud and the image that are collected by the self-driving apparatus) of the self-driving apparatus to a server. The server positions the automobile, the pedestrian, or the other obstacle in the ambient environment of the self-driving apparatus based on the point cloud and the image that are collected by the self-driving apparatus, and controls the self-driving apparatus to perform the corresponding driving operation.

The following describes a method for positioning a target object in an ambient environment.

Figure 3:
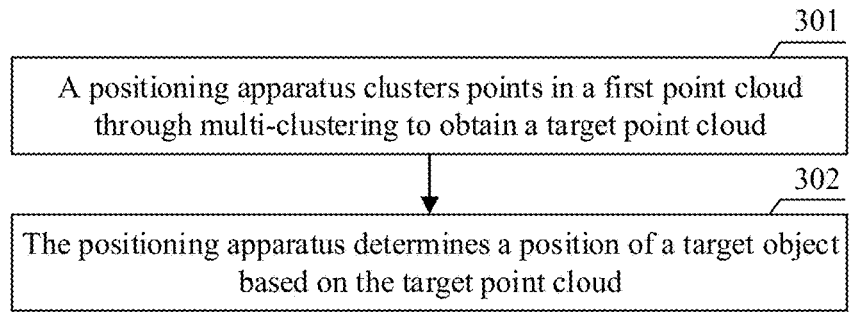
FIG. 3 is a flowchart of a positioning method according to an embodiment of this application.

FIG. 3 shows a positioning method provided in an embodiment of this application. The method may include the following steps.

301: A positioning apparatus clusters points in a first point cloud through multi-clustering to obtain a target point cloud.

The target point cloud is a point cloud that represents a feature of a target object. The first point cloud includes the target point cloud and a point cloud that represents a feature of an interfering object. The positioning apparatus may be a self-driving apparatus, a server, or another device. This is not limited in this application. The target object may be an automobile, a pedestrian, or another obstacle. A clustering method used by the positioning apparatus to perform a clustering operation each time is not limited. For example, the positioning apparatus may use maximum expectation clustering of a Gaussian mixture model, agglomerative clustering, mean shift clustering, or the like.

302: The positioning apparatus determines a position of the target object based on the target point cloud.

Optionally, a manner in which the positioning apparatus positions the target object based on the target point cloud is as follows. First, a centroid of the point cloud (namely, an average value of three-dimensional coordinates of each point) obtained through clustering is calculated based on a three-dimensional coordinate of each point in the target point cloud. A location of the centroid of the point cloud may be used as a location of the target object in a vehicle coordinate system. Therefore, distances between the centroid of the point cloud and an origin of the vehicle coordinate system (namely, a position of the self-driving apparatus) in each coordinate axis direction may be calculated. Alternatively, the positioning apparatus may position the pedestrian, the bicycle, or the other obstacle based on the target point cloud in another manner. This is not limited in this application. The vehicle coordinate system is a special moving coordinate system used to describe motion of a vehicle. The origin coincides with a centroid. When the vehicle is in a still state on a horizontal road, an x axis is parallel to the ground and points to the front of the vehicle, a z axis points to the upper part through the centroid of the vehicle, and a y axis points to the left side of a driver. The centroid may be a center of a rear axle of the vehicle.

In this embodiment of this application, the point cloud that represents the feature of the target object can be accurately extracted from the first point cloud using a multi-clustering method, to position the target object.

The following describes an implementation of clustering the points in the first point cloud through multi-clustering, to obtain the target point cloud.

In an optional implementation, the clustering points in a first point cloud through multi-clustering to obtain a target point cloud may be clustering the points in the first point cloud to obtain a second point cloud, where the second point cloud is a point cloud that has the highest probability of belonging to the target point cloud and that is in a plurality of point clouds obtained by clustering the points in the first point cloud; and when the second point cloud is not the target point cloud, clustering points in a third point cloud at least once to obtain the target point cloud, where the third point cloud is a point cloud other than the second point cloud in the first point cloud.

In this implementation, the positioning apparatus may cluster the first point cloud in any clustering method, and select, in any manner, from the plurality of point clouds obtained through clustering, the point cloud that has the highest probability of belonging to the target point cloud. A manner of determining whether a point cloud is the target point cloud is described in detail subsequently, and details are not described herein. In this implementation, when the point cloud obtained through clustering is not the target point cloud, one or more times of clustering are performed again to obtain the target point cloud. This can effectively avoid a problem that the point cloud obtained through one-time clustering is not the target point cloud. The following describes a specific application of the positioning method in FIG. 3 in a self-driving process.

Figure 4:
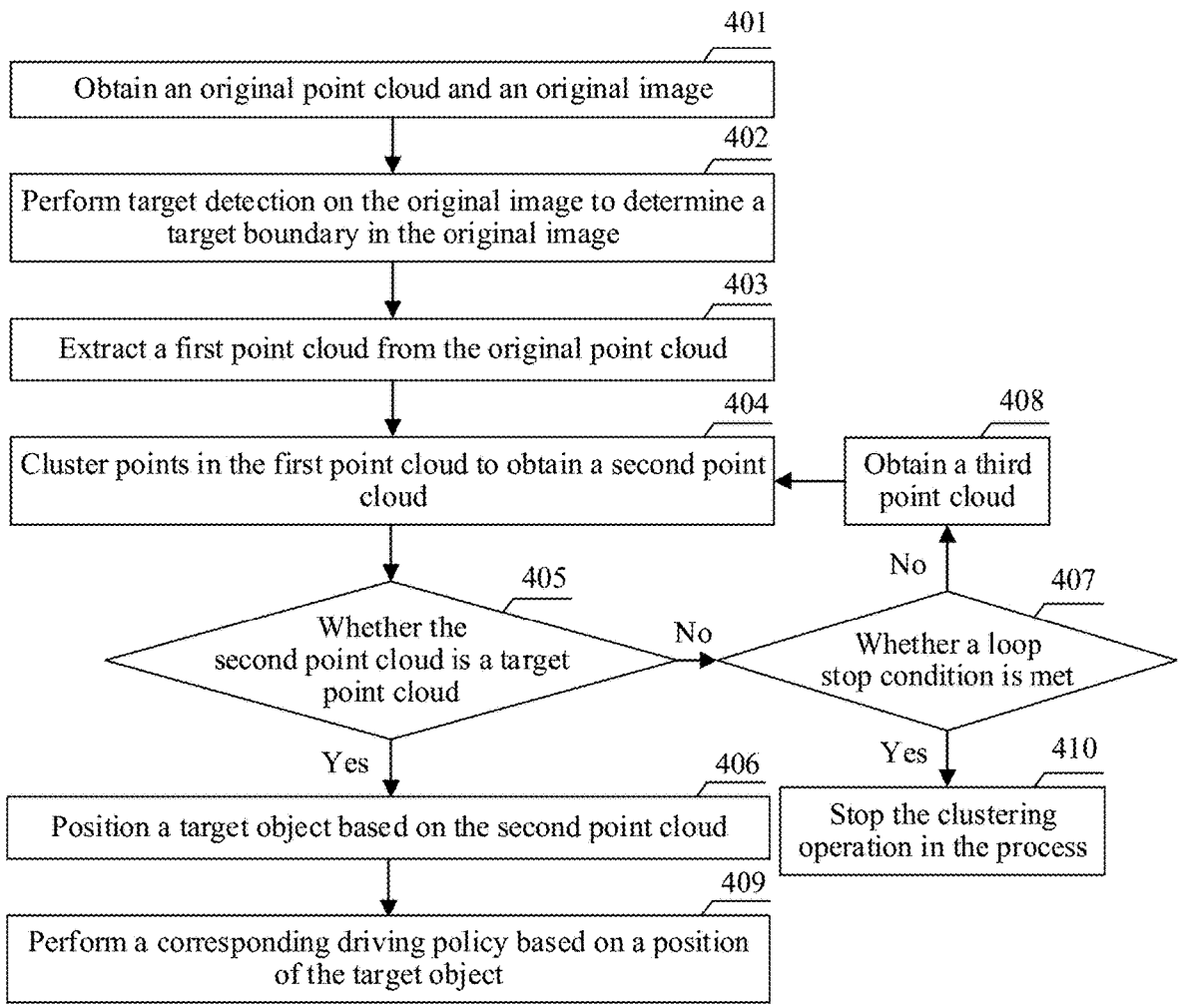
FIG. 4 is a flowchart of a self-driving method according to an embodiment of this application.

FIG. 1 and FIG. 2 each describe the structure of the self-driving apparatus and the structure of the self-driving system. The following describes a self-driving method. FIG. 4 shows a self-driving method according to an embodiment of this application. As shown in FIG. 4, the method may include the following steps.

401: A self-driving apparatus obtains an original point cloud currently obtained using a laser radar, and obtains, from a historical image sequence, an original image whose timestamp is the closest to a timestamp of the original point cloud.

A point cloud (namely, the original point cloud) herein is used to find the image because a frame rate of the image is higher. Optionally, the self-driving apparatus obtains an original image currently obtained using a camera, and obtains, from a historical point cloud, an original point cloud whose timestamp is the closest to a timestamp of the original image. It may be understood that in a dynamic scenario, an interval between a time point at which the self-driving apparatus collects the original image and a time point at which the self-driving apparatus collects the original point cloud is less than a time threshold. The time threshold may be 1 millisecond (ms), 5 ms, 10 ms, or the like. In a static scenario, the interval between the time point at which the self-driving apparatus collects the original image and the time point at which the self-driving apparatus collects the original point cloud may be any duration. If one image matches a plurality of point clouds, the self-driving apparatus separately searches a plurality of groups of historical point clouds for point clouds whose timestamps are closest to a timestamp of the image. A plurality of laser radars may be installed on the self-driving apparatus, and each group of historical point clouds is a series of point clouds obtained by the self-driving apparatus using one laser radar. In an application, the self-driving apparatus may obtain, using the laser radar, point clouds of an ambient environment in real time or near-real time, to obtain the historical point cloud. Each point cloud corresponds to one timestamp. The self-driving apparatus may obtain, using the camera, images of the ambient environment in real time or near-real time, to obtain the historical image sequence. Each image corresponds to one timestamp. Optionally, the self-driving apparatus preprocesses the obtained original point cloud to eliminate a noise point, and preprocesses the obtained original image to further improve quality of the original image.

402: The self-driving apparatus performs target detection on the original image to determine a target boundary in the original image.

As one of core issues in the machine vision field, target detection is to find objects of interest in images and determine positions (usually marked with bounding boxes) and sizes of these objects. The self-driving apparatus performs the target detection on the original image using region based convolutional neural networks (R-CNN) feature series networks. Candidate boxes are selected randomly using the series networks. Features are extracted using a convolutional neural network, and the extracted features are classified using a support vector machine (SVM), a softmax function, a fully connected network, or the like. Finally, the target boundary is obtained through regression. A CNN is short for a convolutional neural network (convolutional neural networks). The R-CNN series networks may include a mask R-CNN, a faster R-CNN, and the like. The self-driving apparatus may perform the target detection on the original image using the R-CNN series networks, to determine the target boundary of an image that includes a target object and that is in the original image. Alternatively, the self-driving apparatus may perform the target detection on the original image in another method, to determine the target boundary of an image that includes a target object and that is in the original image. It may be understood that the target boundary in the original image is a boundary within which the target object in the original image is located, and not only an image of the target object but also an image of at least one interfering object are within the target boundary. For example, an automobile and a pedestrian in the original image are located in a same area, and a part of an image of the driving car is within the boundary that is of an image of the vehicle and that is determined by the self-driving apparatus. The target boundary in the original image is a region of interest (ROI) in the original image. Performing target detection on a given image to determine an ROI (for example, a target boundary) is a common technical means in this field, and details are not described herein. The self-driving apparatus may perform the target detection on the original image to determine a plurality of boundaries in the original image. An image of at least one object is within each boundary, and the target boundary is one of the plurality of boundaries. It may be understood that the self-driving apparatus performs the target detection on the original image, and determines a boundary of at least one detected target. The at least one target may be all objects that can be recognized by the self-driving apparatus, or may be some preconfigured objects, such as an automobile and a pedestrian. Assuming that the self-driving apparatus performs the target detection on the original image, five targets are detected, and five boundaries are determined. An image of one target is within each boundary. For example, the self-driving apparatus performs the target detection on the original image, and if a car and a bicycle are detected, the self-driving apparatus determines that the original image includes a boundary of an image of the car and a boundary of an image of the bicycle.

403: The self-driving apparatus extracts a first point cloud from the original point cloud based on the target boundary in the original image.

The first point cloud includes a point cloud that represents a surface feature of the target object and a point cloud that represents a surface feature of an interfering object. Each point in the original point cloud corresponds to one pixel in the original image. Pixels in the original image corresponding to the points in the first point cloud are within a target boundary of the original image. Pixels in the original image corresponding to points other than the first point cloud in the original point cloud are not within the target boundary. An image of the target object is within the target boundary.

404: The self-driving apparatus clusters points in the first point cloud to obtain a second point cloud.

The second point cloud is a point cloud that has the highest probability of belonging to the target point cloud and that is in a plurality of point clouds obtained by clustering the points in the first point cloud. Optionally, the second point cloud is a point cloud that includes the maximum quantity of points that is in the plurality of point clouds obtained by clustering the points in the first point cloud. The self-driving apparatus may cluster the points in the first point cloud using any clustering algorithm. Optionally, steps of clustering, by the self-driving apparatus, the points in the first point cloud are as follows. (1) Vertically project the points in the first point cloud to xy planes of a vehicle coordinate system (namely, a z axis is not considered or a z axis component is set to 0), determine a clustering parameter (for example, a minimum quantity of point and a neighborhood), and perform a clustering operation to obtain a point cloud with a maximum quantity of points. For example, a density-based clustering algorithm (Density-Based Spatial Clustering of Applications with Noise (DBSCAN)) is used to cluster the points that are in the first point cloud and that are vertically projected to the xy planes of the vehicle coordinate system, to obtain the second point cloud including the maximum quantity of points. For example, steps in which the self-driving apparatus clusters the first point cloud using the DBSCAN clustering algorithm are as follows.

(1) Set a clustering parameter, namely, the minimum quantity of points (MinPts) and the neighborhood (eps), based on an average distance between the first point cloud and the self-driving apparatus.

According to results of a plurality of experiments, an initial clustering parameter may be set according to Table 1. An average distance in Table 1 is an average distance from each point in the first point cloud to the self-driving apparatus.

TABLE 1

| Average distance | Minimum quantity of points (MinPts) | Neighbourhood (eps) |
|---|---|---|
| <10 meter (m) | 50 | 0.9 |
| 10 m to 25 m | 20 | 1.5 |
| >25 m | 5 | 2.0 |

(2) Cluster, using the clustering parameter, the points that are in the first point cloud and that are vertically projected to the xy planes of the vehicle coordinate system, to obtain the second point cloud including the maximum quantity of points.

(3) Determine whether the second point cloud is the target point cloud. If the second point cloud is the target point cloud, the second point cloud is output. If the second point cloud is not the target point cloud, a point cloud other than the second point cloud in the first point cloud is extracted to obtain a third point cloud, a clustering parameter is determined based on the third point cloud, clustering is performed again, and the like until an end.

405: The self-driving apparatus determines whether the second point cloud is a target point cloud.

If the second point cloud is not the target point cloud, a step S407 is performed. If the second point cloud is the target point cloud, a step 406 is performed. How to determine whether the second point cloud is the target point clouds is described in detail subsequently, and details are not described herein.

406: The self-driving apparatus positions the target object based on the second point cloud.

Optionally, the second point cloud is processed in a matrix decomposition method to fit L-shaped long and short sides of a vehicle. A position and an orientation of the vehicle are provided based on the L-shaped long and short sides. A principle of the method is as follows. A top-view projection of each vehicle is close to a rectangle by default, and a laser can mark two vertical sides of the vehicle. An L shape is fitted using points projected from the two sides to a top view, and the vehicle is positioned based on a turning point and prior knowledge. Optionally, a process in which the self-driving apparatus positions the target object is as follows. First, a centroid of the point cloud (namely, an average value of each coordinate axis) obtained through clustering is calculated based on a coordinate of each point in the second point cloud. A location of the centroid of the point cloud may be used as a location of the obstacle in the vehicle coordinate system. Therefore, distances between the centroid of the point cloud and an origin of the vehicle coordinate system (namely, a position of the self-driving apparatus) in each coordinate axis direction may be calculated. Alternatively, the self-driving apparatus may position the pedestrian, the bicycle, or the other obstacle based on the second point cloud in another manner. This is not limited in this application. The step 401 to the step 406 describe the process in which the self-driving apparatus positions the target object. In an application, the self-driving apparatus may position, in a similar manner, a plurality of objects that are obtained by detecting the original image, to determine positions of objects in the ambient environment.

407: The self-driving apparatus determines whether a loop stop condition is met.

If the loop stop condition is met, a step 4010 is performed. If the loop stop condition is not met, a step 408 is performed. The loop stop condition may be that a quantity of clustering operations is greater than a first threshold, or may be that a quantity of points in the third point cloud is less than a second threshold. The third point cloud is a point cloud other than the second point cloud in the original point cloud. The quantity of clustering operations is a quantity of times that the self-driving apparatus performs the step 304. Each time performing the step 404, the self-driving apparatus clusters different point clouds. The first threshold may be 3, 4, 5, 10, or the like. The second threshold may be 10, 20, 30, 50, or the like.

408: The self-driving apparatus obtains points other than the second point cloud in the original point cloud to obtain the third point cloud.

After performing the step 408, the self-driving apparatus performs the step 404. A multi-clustering method is used in FIG. 4. A specific example is as follows. (1) Vertically project the first point cloud to the xy planes of the vehicle coordinate system (namely, the z axis is not considered or the z axis component is set to 0), determine the clustering parameter, and perform the clustering operation to obtain the second point cloud with the maximum quantity of points. (2) Determine whether the second point cloud obtained through clustering is the target point cloud; and if the second point cloud obtained through clustering is the target point cloud, output the second point cloud obtained through clustering; or if the second point cloud obtained through clustering is not the target point cloud, remove the second point cloud in the first point cloud to obtain the third point cloud, adjust the clustering parameter, and perform the clustering operation again until the target point cloud is obtained or the loop stop condition is met.

409: The self-driving apparatus performs a corresponding driving policy based on the position of the target object.

Optionally, the self-driving apparatus performs the corresponding driving policy based on a position of each object in the ambient environment of the self-driving apparatus.

410: The self-driving apparatus stops the clustering operation in this procedure.

Optionally, the obstacle avoidance system 144 in the self-driving apparatus uses the point cloud obtained by the laser radar and the image that is of the ambient environment and that is obtained by the camera to position the target object. The route control system 142 in the self-driving apparatus determines a driving route (namely, the driving policy) of the self-driving apparatus 100 based on the position of the target object.

In this embodiment of this application, the point cloud of the target object, with a relatively small quantity of reflection points can be accurately extracted using the multi-clustering method, to effectively overcome a problem that the point cloud belonging to the obstacle cannot be accurately found in one-time clustering.

Before performing the step 401, the self-driving apparatus may perform the following operation. The self-driving apparatus receives a self-driving task. The self-driving apparatus may receive, through the peripheral device 108, the self-driving task input by a user. For example, the self-driving apparatus receives the self-driving task input by the user through the vehicle-mounted computer 148. The user may input the self-driving task through a touchscreen of the vehicle-mounted computer 148, that is, input a start position and a target position (destination) of the driving task. For another example, the self-driving apparatus receives, through the microphone 150, a voice command input by the user. The voice command indicates the self-driving apparatus to process a specific self-driving task. For another example, the self-driving apparatus receives, through a transceiver, the self-driving task sent by a user terminal (for example, a mobile phone). The self-driving apparatus may alternatively receive the self-driving task in another manner. This is not limited in this embodiment of this application.

A manner of extracting the first point cloud from the original point cloud based on the target boundary in the original image is not described in detail in the foregoing embodiment. The self-driving apparatus may extract the first point cloud from the original point cloud based on the target boundary in the original image in the following two manners.

Manner 1: The self-driving apparatus projects the original point cloud to an image coordinate system, and extracts the first point cloud from the original point cloud. All points from the first point cloud that are projected to the image coordinate system belong to points included in the target boundary. In other words, if a point projected onto the image coordinate system is within the target boundary, the point belongs to the first point cloud. The self-driving apparatus may project the original point cloud to the image coordinate system in the following manner. The original point cloud is converted from a laser radar coordinate system to a camera coordinate system based on a calibrated rotation translation matrix, and then, perspective projection is used to obtain an image coordinate corresponding to each point. The perspective projection is to project a shape onto a projection surface using a center projection method in order to obtain a single-side projection image that is close to a visual effect.

A process for projecting the point cloud is as follows. It is known that a rotation matrix of the original point cloud from the laser radar coordinate system to the camera coordinate system is R, a translation vector is t, and a distance from an image plane to a camera origin is f. It is assumed that a coordinate of the original point cloud in the laser radar coordinate system is (x, y, z), and a corresponding pixel coordinate is ($u_0$, $v_0$), the following equation exists.

$$Z_c \begin{bmatrix} u \\ v \\ 1 \end{bmatrix} = \begin{bmatrix} \frac{1}{dx} & 0 & u_0 \\ 0 & \frac{1}{dy} & v_0 \\ 0 & 0 & 1 \end{bmatrix} \begin{bmatrix} f & 0 & 00 \\ 0 & f & 00 \\ 0 & 0 & 10 \end{bmatrix} \begin{bmatrix} R & t \\ 0^T & 1 \end{bmatrix} \begin{bmatrix} x \\ y \\ z \\ 1 \end{bmatrix}$$

where $Z_c$ is a unit vector of a camera coordinate Z axis, dx, and dy are sizes of each pixel in the camera coordinate system, and $u_0$ and $v_0$ are an image plane center. The image plane is a plane in which the original image is located. Both the rotation matrix R and the translation vector t are known, and are related to a parameter of the camera.

Manner 2: The self-driving apparatus generates a target frustum based on the target boundary, and extracts points that are in the target frustum and that are in the original point cloud, to obtain the first point cloud. The target boundary is a rectangular box.

A principle of extracting the first point cloud from the original point cloud based on the target boundary is as follows. In a camera coordinate system, a coordinate origin is connected to each of four vertices of the target boundary, to form the frustum, and all laser points falling within the frustum are the first point cloud that needs to be extracted. A process of determining the first point cloud in the frustum is as follows. 1. Separately calculate four side faces of the frustum based on the coordinate origin and two vertices on each side of the target boundary, where a distance from an image plane to the origin of the camera coordinate system is known. 2. Determine a location of a to-be-determined point relative to locations of the four sides, where if the point is inside a bounding box of the four sides, the point is required; otherwise, the point is discarded.

The self-driving apparatus may extract the first point cloud from the original point cloud based on the target boundary in the original image in another manner. This is not limited in this application. The first point cloud is a to-be-clustered point cloud.

The following describes a method for determining whether the second point cloud is the target point cloud, that is, describes a specific implementation of the step 405.

That the self-driving apparatus determines whether the second point cloud is the target point cloud may be that the self-driving apparatus determines whether the second point cloud meets a target condition. If the second point cloud meets the target condition, the second point cloud is the target point cloud; otherwise, the second point cloud is not the target point cloud. That the second point cloud meets the target condition may be as follows. A Euclidean distance or a one-norm between any points in the plurality of points obtained through vertical projection of the second point cloud is less than a third threshold, or a height difference between the highest point and the lowest point in the second point cloud is less than a fourth threshold. For an obstacle such as a pedestrian or a bicycle, an interfering object is generally an object such as a car, a wall, or a telegraph pole behind the pedestrian or the bicycle. Therefore, determining whether the second point cloud meets the target condition may be as follows.

(1) Calculate a Euclidean distance between any two points on an aerial view obtained by vertically projection of each point in the second point cloud, where if the Euclidean distance between any two points is not less than the third threshold (for example, 2 meters), it is considered that the second point cloud does not meet the target condition.

(2) Calculate the difference between the highest point and the lowest point at a z axis component in the second point cloud, where if the difference is not less than the fourth threshold (for example, 2.5 meters), it is considered that the second point cloud does not meet the target condition.

To reduce impact of noise points, (1) may be replaced with a step of calculating a Euclidean distance between any two points on an aerial view obtained by vertically projection of each point in the second point cloud, where if Euclidean distances between M groups of points are not less than the third threshold, the second point cloud does not meet the target condition. M is an integer greater than 1, and may be 3, 4, 6, 10, or the like. Any group of points in the M groups of points are points obtained by performing vertical projection on the points in the second point cloud, and any group of points include two points. Likewise, to reduce the impact of a noise, (2) may be replaced with a step of calculating differences between a plurality of highest points and at least one lowest point in the second point cloud, to obtain a plurality of height values, where if more than N of the plurality of height values are not less than the fourth threshold, the second point cloud does not meet the target condition. N is an integer greater than 1, and may be 3, 4, 6, 10, or the like. To accelerate calculation, the Euclidean distance between the two points in (1) may be changed to the one-norm, and the threshold is correspondingly changed. The self-driving apparatus may alternatively determine, in another manner, whether the second point cloud belongs to the point cloud of the interfering object. This is not limited in this application. In other words, the self-driving apparatus may determine, in any manner, whether the point cloud obtained through the clustering operation belongs to the point cloud of the interfering object. It should be understood that the step 305 performed by the self-driving apparatus is determining whether the point cloud obtained through clustering in the step 304 belongs to the point cloud of the interfering object.

Figure 5:
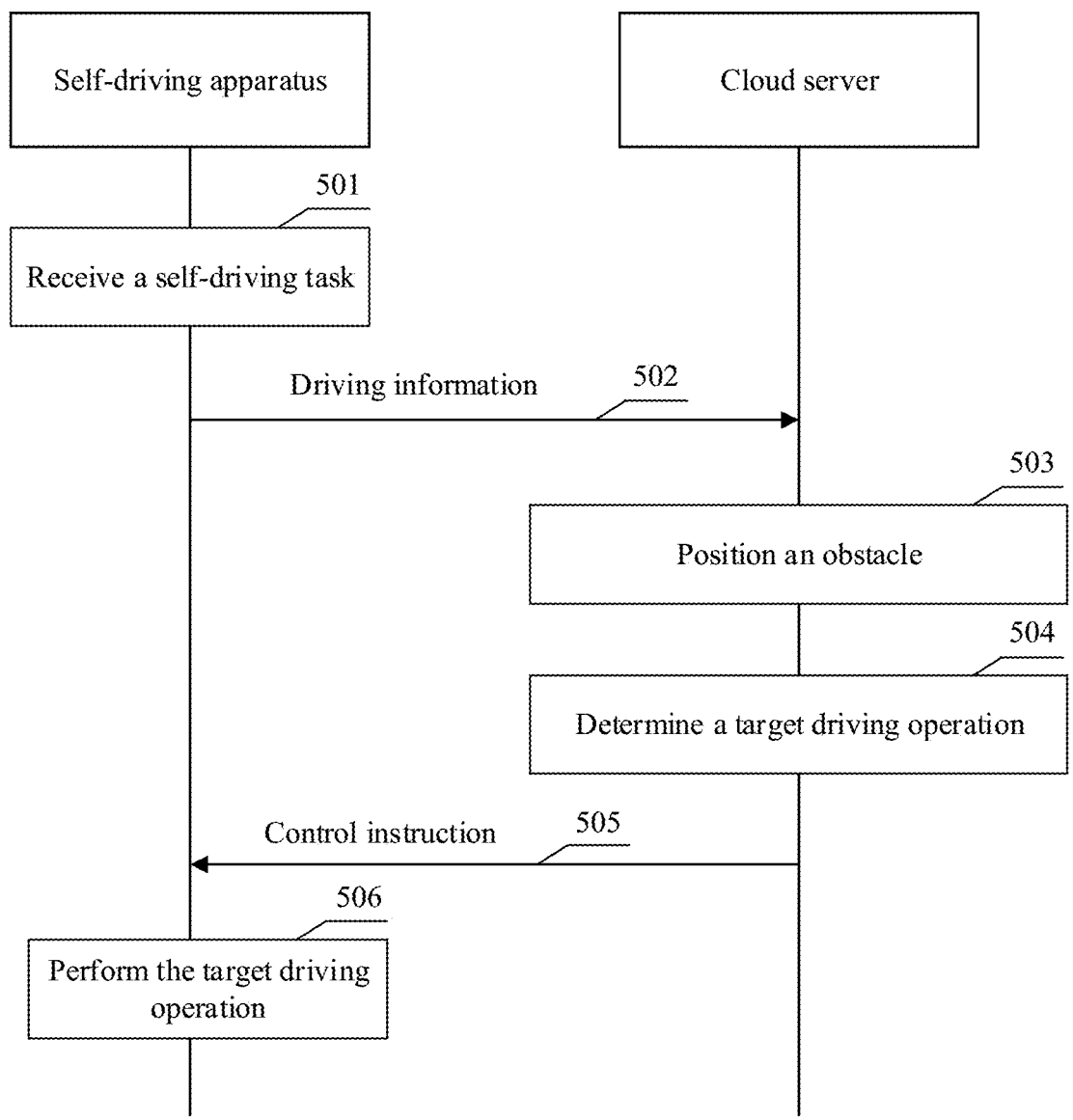
FIG. 5 is a flowchart of another self-driving method according to an embodiment of this application.

In the method in FIG. 4, the self-driving apparatus needs to position the obstacle by the self-driving apparatus, and perform the corresponding driving policy. The following describes a self-driving method in which a self-driving apparatus does not need to position an obstacle by the self-driving apparatus. FIG. 5 shows another self-driving method according to an embodiment of this application. As shown in FIG. 5, the method may include the following steps.

501: A self-driving apparatus receives a self-driving task.

The self-driving apparatus may receive, through a peripheral device 108, the self-driving task input by a user. For example, the self-driving apparatus receives the self-driving task input by the user through a vehicle-mounted computer 148. The user may input the self-driving task through a touchscreen of the vehicle-mounted computer 148, that is, input a start position and a target position (destination) of the driving task. For another example, the self-driving apparatus receives, through a microphone 150, a voice command input by the user. The voice command indicates the self-driving apparatus to process a specific self-driving task. For another example, the self-driving apparatus receives, through a transceiver, the self-driving task sent by a user terminal (for example, a mobile phone). The self-driving apparatus may alternatively receive the self-driving task in another manner. This is not limited in this embodiment of this application.

502: The self-driving apparatus sends driving information to a cloud server through a transceiver.

Figure 6:
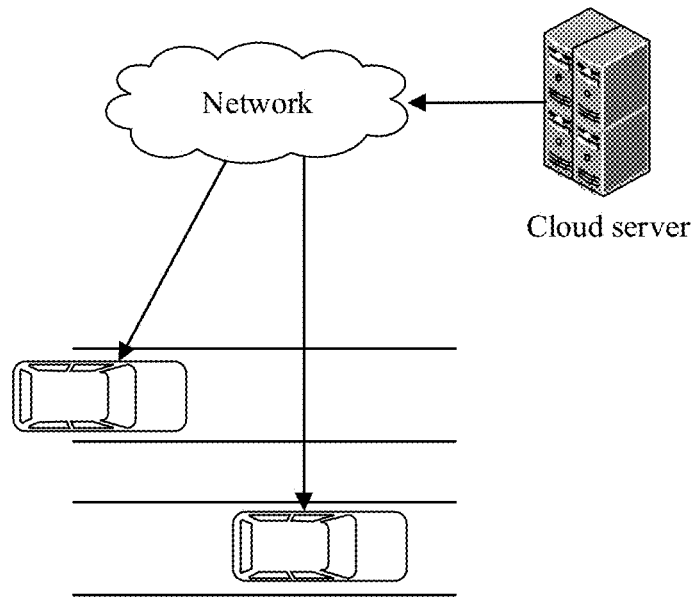
FIG. 6 is a schematic diagram of a self-driving scenario according to an embodiment of this application.

The driving information may include an identifier of the self-driving apparatus, the self-driving task, and sensor data related to determining a driving status or an ambient environment of the self-driving apparatus, for example, a point cloud and an image. As shown in FIG. 6, the self-driving apparatus and the cloud server may interact with each other through a network. The network may include various configurations and protocols, including the internet, the world wide web, the intranet, a virtual private network, a wide area network, a local area network, a private network using one or more company-specific communications protocols, the ethernet, Wi-Fi®, and an Hypertext Transfer Protocol (HTTP), and various combinations thereof. Optionally, the self-driving apparatus may send the current driving information to the cloud server in real time or at preset intervals.

503: The cloud server positions an obstacle in an ambient environment of the self-driving apparatus based on the driving information.

Optionally, the cloud server performs steps similar to the step 401 to the step 406 to position the obstacle in the ambient environment of the self-driving apparatus. In other words, the cloud server extracts a point cloud of each obstacle (namely, a point cloud that represents a surface feature of each obstacle) using a multi-clustering method based on the point cloud and image data that are obtained by the self-driving apparatus, and positions each obstacle based on the point cloud of each obstacle. It should be understood that the operation, performed by the self-driving apparatus in FIG. 4, of positioning the target object may be implemented by the cloud server. Because the cloud server has a stronger processing capability than the self-driving apparatus, the cloud server can position the target object more accurately. In addition, corresponding software needs to be installed for the self-driving apparatus to implement an obstacle positioning function. The cloud server may control a plurality of self-driving apparatuses, and each self-driving apparatus does not need to position an obstacle. Therefore, costs can be greatly reduced.

504: The cloud server determines, based on a position of the obstacle in the ambient environment of the self-driving apparatus, a target driving operation that needs to be performed by the self-driving apparatus.

The cloud server determines, based on the position of the obstacle in the ambient environment of the self-driving apparatus, a speed and acceleration, and other information of the self-driving apparatus, the target driving operation that needs to be performed by the self-driving apparatus.

505: The cloud server sends a control instruction to the self-driving apparatus.

The control instruction is used to instruct the self-driving apparatus to perform the target driving operation (corresponding to the driving policy in FIG. 4).

506: The self-driving apparatus performs the target driving operation.

The self-driving apparatus only needs to send the self-driving task and the data collected by a sensor to the cloud server, and perform the corresponding driving operation according to the control instruction sent by the cloud server.

In this embodiment of this application, the processing capability and a data storage capability of the cloud server are far beyond those of the self-driving apparatus. The cloud server may fully use a processing resource and a storage resource of the cloud server to provide a self-driving service for each self-driving apparatus. In addition, the self-driving apparatus does not need to determine, by the self-driving apparatus, the driving operation that needs to be performed. Therefore, workload is comparatively small.

FIG. 6 is a schematic diagram of an architecture between a self-driving apparatus and a cloud server. The cloud server may receive information (for example, data or other information collected by a vehicle sensor) from the self-driving apparatus in an operating environment of the cloud server through a network such as a wireless communications network. The information received by the cloud server may be an image, a point cloud, a driving task, and the like that are collected by the self-driving apparatus.

The cloud server runs, based on the received data, a program that is related to self-driving and that is stored in the cloud server, to control the self-driving apparatus. The program related to the self-driving may be a program for managing interaction between the self-driving apparatus and an obstacle on a road, a program for controlling a route or speed of the self-driving apparatus, or a program for controlling interaction between a self-driving car and another self-driving car on a road.

In some examples, the cloud server may send, to the self-driving apparatus, a recommended solution (for example, informing a front obstacle and how to bypass it) about a possible driving situation in an environment. For example, the cloud server may assist a vehicle in determining how to move in the face of a particular obstacle in the environment. The cloud server sends, to the self-driving apparatus, a response indicating how the self-driving apparatus should move in a given scenario. For example, the cloud server may determine, based on the collected sensor data (the images and the point clouds), that there is a temporary stop sign in front of a road, and further determine, based on a "lane closed" sign and sensor data from a construction vehicle, that the lane is closed due to construction. Correspondingly, the cloud server sends a suggested operation mode used by the self-driving apparatus to pass through the obstacle (for example, indicating the vehicle to change to a lane on another road). When the cloud server observes a video stream in an operating environment of the cloud server and determines that the self-driving apparatus can safely and successfully pass through the obstacle, operation steps used for the self-driving apparatus may be added to a driving information map. Correspondingly, the information may be sent to another self-driving apparatus that may encounter the same obstacle in the area in order to assist the other self-driving apparatus in identifying the closed lane and knowing how to pass through the closed lane.

Figure 7:
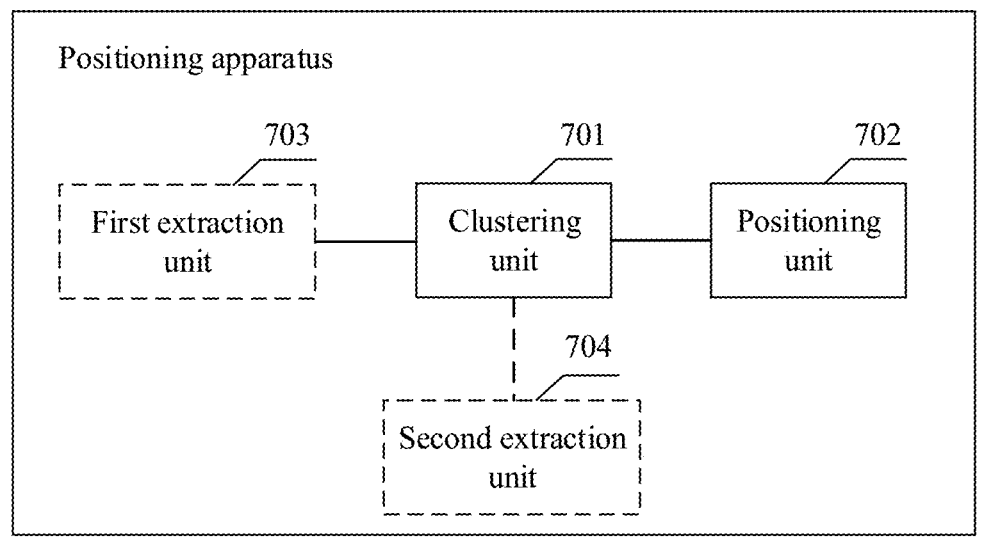
FIG. 7 is a schematic diagram of a structure of a positioning apparatus according to an embodiment of this application.

The following describes a process of positioning a target object with reference to a structure of a positioning apparatus. FIG. 7 is a schematic diagram of a structure of a positioning apparatus according to an embodiment of this application. As shown in FIG. 7, the positioning apparatus includes a clustering unit 701 configured to cluster points in a first point cloud through multi-clustering to obtain a target point cloud, where the target point cloud is a point cloud that represents a feature of a target object, and the first point cloud includes the target point cloud and a point cloud that represents a feature of an interfering object; and a positioning unit 702 configured to determine a position of the target object based on the target point cloud.

Functions of both the clustering unit 701 and the positioning unit 702 are implemented by the computer vision system 140 in FIG. 1. The positioning apparatus may be a self-driving apparatus, a server, or another device.

In a specific implementation process, the clustering unit 701 is configured to perform the method mentioned in the step 301 and a method that can be equivalently replaced. The positioning unit 702 is configured to perform the method mentioned in the step 406 and a method that can be equivalently replaced.

In an optional implementation, as shown in FIG. 7, the positioning apparatus further includes a first extraction unit 703 configured to extract points other than the second point cloud in the first point cloud to obtain the third point cloud.

The clustering unit 701 is configured to cluster points in the third point cloud to obtain a fourth point cloud, where the fourth point cloud is a point cloud that has the highest probability of belonging to the target point cloud and that is in a plurality of point clouds obtained by clustering the points in the third point cloud; and when the fourth point cloud is not the target point cloud, a quantity of clustering operations is less than a first threshold, and a quantity of points in a fifth point cloud is not less than a second threshold, cluster points in the fifth point cloud at least once to obtain the target point cloud, where the fifth point cloud is a point cloud other than the fourth point cloud in the third point cloud.

In this implementation, when the fifth point cloud meets a minimum requirement for clustering, the fifth point cloud is clustered to extract the target point cloud, to reduce an unnecessary operation.

In an optional implementation, as shown in FIG. 7, the positioning apparatus further includes a second extraction unit 704 configured to extract the first point cloud from an original point cloud, where each point in the original point cloud corresponds to one pixel in an original image, pixels in the original image corresponding to the points in the first point cloud are within a target boundary of the original image, pixels in the original image corresponding to points other than the first point cloud in the original point cloud are not within the target boundary, and an image of the target object is within the target boundary. The second extraction unit 704 and the first extraction unit 703 may be the same unit, or may be two independent units.

In this implementation, the point cloud corresponding to the target object can be accurately extracted using the target boundary in the original image, and implementation is simple.

Figure 8:
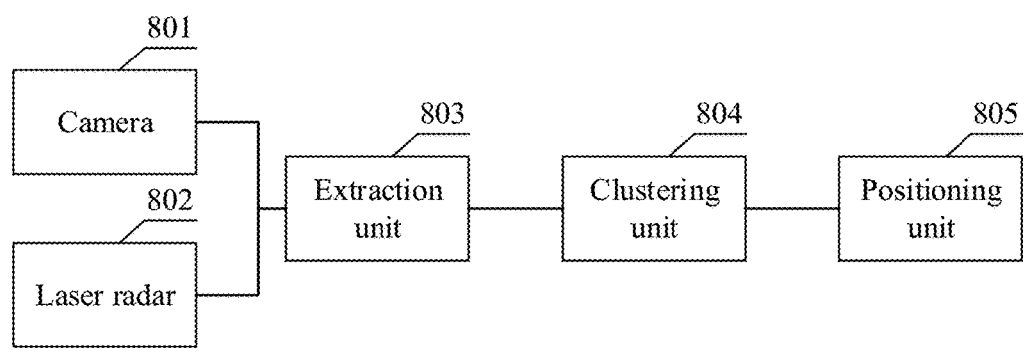
FIG. 8 is a schematic diagram of a structure of a self-driving apparatus according to an embodiment of this application.

The following describes, with reference to a structure of a self-driving apparatus, how the self-driving apparatus implements self-driving. FIG. 8 is a schematic diagram of a structure of a self-driving apparatus according to an embodiment of this application. As shown in FIG. 8, the self-driving apparatus includes a camera 801 configured to obtain an original image; a laser radar 802 configured to obtain an original point cloud; an extraction unit 803 configured to extract a first point cloud from the original point cloud, where each point in the original point cloud corresponds to one pixel in the original image, pixels in the original image corresponding to the points in the first point cloud are within a target boundary of the original image, pixels in the original image corresponding to points other than the first point cloud in the original point cloud are not within the target boundary, an image of the target object is within the target boundary, and the first point cloud includes a target point cloud that represents a feature of the target object and a point cloud that represents a feature of an interfering object; a clustering unit 804 configured to cluster points in the first point cloud to obtain the target point cloud; and a positioning unit 805 configured to determine a position of the target object based on the target point cloud.

The laser radar 802 is the radar 126 in FIG. 1. The camera 801 is the camera 130 in FIG. 1. Functions of the extraction unit 803, the clustering unit 804, and the positioning unit 805 are all implemented by the computer vision system 140 in FIG. 1. In other words, the computer vision system 140 includes the extraction unit 803, the clustering unit 804, and the positioning unit 805.

In a specific implementation process, the extraction unit 803 is configured to perform the method mentioned in the step 403 and a method that may be equivalently replaced. The clustering unit 804 is configured to perform the method mentioned in the step 404 and a method that may be equivalently replaced. The positioning unit 805 is configured to perform the method mentioned in the step 406 and a method that can be equivalently replaced.

Figure 9:
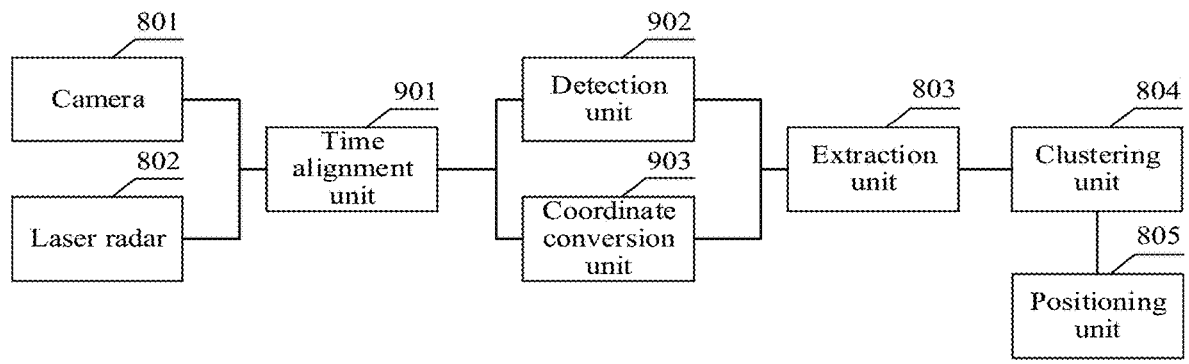
FIG. 9 is a schematic diagram of a structure of another self-driving apparatus according to an embodiment of this application.

In an optional implementation, as shown in FIG. 9, the self-driving apparatus further includes a time alignment unit 901 configured to obtain, from a historical image sequence, the original image whose timestamp is the closest to a timestamp of the original point cloud; a detection unit 902 configured to perform target detection on the original image to obtain the target boundary; and a coordinate conversion unit 903 configured to convert the original point cloud from a vehicle coordinate system to an image coordinate system.

The extraction unit 803 is configured to extract the target points from the original point cloud to obtain the first point cloud, where points in the target points, projected to the image coordinate system are within the target boundary; or is configured to generate a target frustum based on the target boundary, and process points within the target frustum in the original point cloud to obtain the first point cloud.

Functions of the time alignment unit 901, the detection unit 902, and the coordinate conversion unit 903 are all implemented by the computer vision system 140 in FIG. 1. In a specific implementation process, the time alignment unit 901 is configured to perform the method mentioned in the step 401 and a method that can be equivalently replaced. The detection unit 902 is configured to perform the method mentioned in the step 402 and a method that can be equivalently replaced. In an application, the camera 801 provides obtained image data to the time alignment unit 901 in real time or near-real time. The laser radar 802 provides the obtained point cloud to the time alignment unit 901 in real time or near-real time. The time alignment unit 901 obtains the original image in the historical image sequence based on recently obtained point cloud (namely, the original point cloud). Functions of the extraction unit 803, the clustering unit 804, the positioning unit 805, the time alignment unit 901, the detection unit 902, and the coordinate conversion unit 903 may all be implemented by the processor 113.

It should be understood that, division into the units in the positioning apparatus and the self-driving apparatus is merely logical function division. During an implementation, all or some of the units may be integrated into one physical entity, or the units may be physically separate. For example, each of the foregoing units may be a separate processor element, or may be integrated on a chip of a terminal, or may be stored in a storage element of a controller in a form of program code. A processor element of the processor invokes and executes a function of each of the foregoing units. In addition, the units may be integrated or may be implemented separately. The processor element may be an integrated circuit chip, and has a signal processing capability. In an implementation process, steps in the foregoing methods or the foregoing units can be implemented using a hardware integrated logic circuit in the processor element, or using instructions in a form of software. The processor element may be a general purpose processor, for example, a CPU), or may be one or more integrated circuits configured to implement the foregoing methods, for example, one or more ASICs), one or more microprocessors (digital signal processors (DSPs)), or one or more field-programmable gate arrays (FPGAs).

Figure 10:
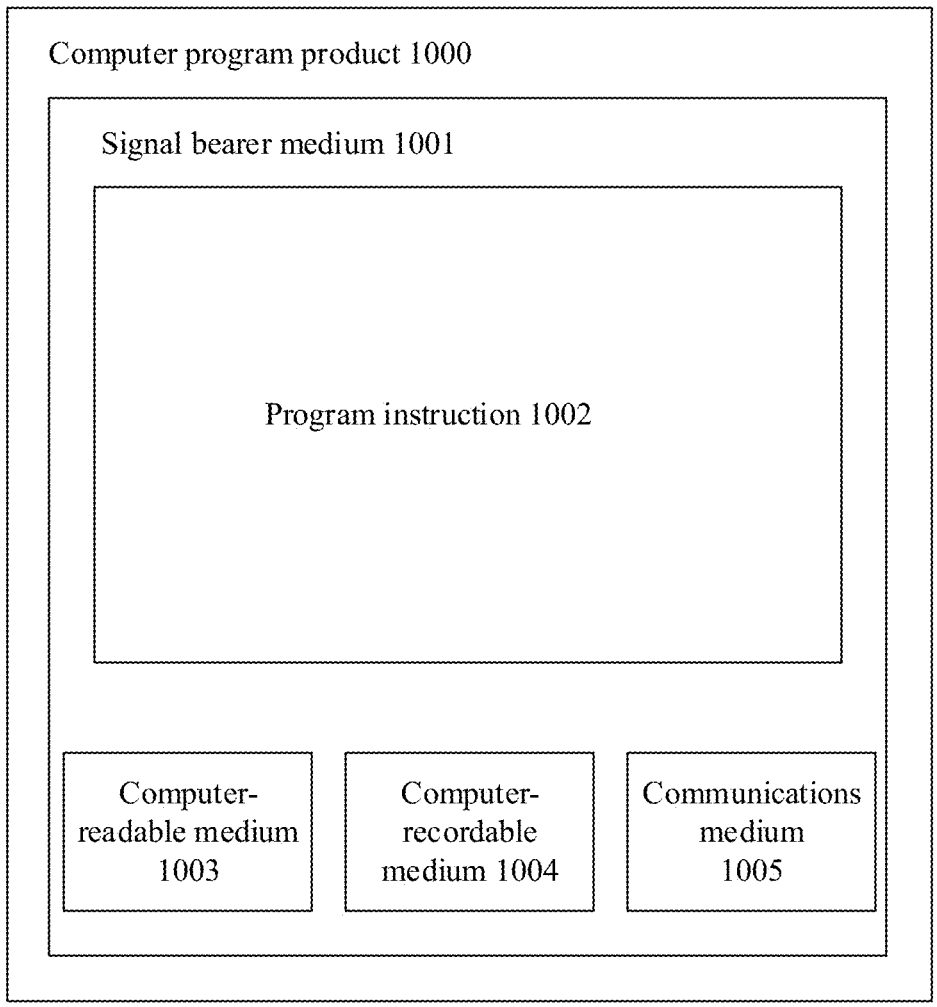
FIG. 10 is a schematic diagram of a structure of a computer program product according to an embodiment of this application.

In some embodiments, the disclosed method may be implemented as a computer program instruction encoded in a machine-readable format on a computer-readable storage medium or encoded on another non-transitory medium or product. FIG. 10 schematically shows a conceptual partial view of an example computer program product arranged according to at least some embodiments shown herein, the example computer program product includes a computer program for executing a computer process on a computing device. In an embodiment, the example computer program product 1000 is provided using a signal bearer medium 1001. The signal bearer medium 1001 may include one or more program instructions 1002. When the program instructions are run by one or more processors, the functions or some of the functions described for FIG. 8 and FIG. 9 may be provided. Therefore, for example, with reference to the embodiment shown in FIG. 8, the implementation of the functions of one or more blocks 801 to 805 may be undertaken by one or more instructions associated with the signal bearer medium 1001. In addition, the program instructions 1002 in FIG. 10 also described as example instructions. When the program instructions 1002 are executed by the processor, the following functions are implemented. Clustering points in a first point cloud through multi-clustering to obtain a target point cloud, where the target point cloud is a point cloud that represents a feature of a target object, and the first point cloud includes the target point cloud and a point cloud that represents a feature of an interfering object; and determining a position of the target object based on the target point cloud.

In some examples, the signal bearer medium 1001 may include a computer-readable medium 1003, such as, but not limited to, a hard disk drive, a compact disk (CD), a digital video disc (DVD), a digital magnetic tape, a memory, a read-only memory (ROM), a random-access memory (RAM), or the like. In some implementations, the signal bearer medium 1001 may include a computer-recordable medium 1004, for example, but not limited to, a memory, a read/write (R/W) CD, an R/W DVD, and the like. In some implementations, the signal bearer medium 1001 may include a communications medium 1005, for example, but is not limited to a digital and/or analog communications medium (for example, an optical fiber cable, a waveguide, a wired communications link, or a wireless communications link). Therefore, for example, the signal bearer medium 1001 may be conveyed by a wireless-form communications medium 1005 (for example, a wireless communications medium that complies with the Institute of Electrical and Electronics Engineers (IEEE) 802.11 standard or another transmission protocol). The one or more program instructions 1002 may be, for example, computer-executable instructions or one or more logic implementation instructions. In some examples, a processor such as the processor described for FIG. 1 may be configured to provide various operations, functions, or actions in response to the one or more program instructions 1002 transmitted to the processor using the computer-readable medium 1003, the computer-recordable medium 1004, and/or the communications medium 1005. It should be understood that the arrangement described herein is merely for purpose of an example. Thus, a person skilled in the art appreciates that another arrangement and another element (for example, a machine, an interface, a function, a sequence, and a group of functions) can be used to replace the arrangement, and some elements may be omitted together depending on a desired result. In addition, many of the described elements are functional entities that can be implemented as discrete or distributed components, or implemented in any suitable combination and at any suitable location in combination with another component.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described according to flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner such that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A positioning method, comprising:
    clustering points in a first point cloud through multi-clustering to obtain a second point cloud, wherein the second point cloud has a highest probability among the first point cloud of belonging to a target point cloud based on an average distance between the first point cloud and a centroid of the second point cloud according to a moving coordinate system of a self-driving apparatus, wherein the target point cloud represents a surface feature of a target object, and wherein the first point cloud comprises the target point cloud and another point cloud that represents a surface feature of an interfering object;
    clustering points in a third point cloud at least once to obtain the target point cloud when the second point cloud is not the target point cloud, wherein the third point cloud is not the second point cloud; and
    determining a position of the target object based on the target point cloud.

2. The positioning method of claim 1, wherein clustering the points in a third point cloud at least once to obtain the target point cloud comprises:
    clustering the points in the third point cloud to obtain a fourth point cloud, wherein the fourth point cloud has the highest probability, among the point clouds, of belonging to the target point cloud; and
    clustering points in a fifth point cloud at least once to obtain the target point cloud when the fourth point cloud is not the target point cloud, a quantity of clustering operations is less than a first threshold, and a quantity of points in a fifth point cloud is not less than a second threshold, wherein the fifth point cloud is other than the fourth point cloud in the third point cloud.

3. The positioning method of claim 1, wherein before clustering the points in the third point cloud at least once to obtain the target point cloud, the method further comprises extracting points other than the second point cloud in the first point cloud to obtain the third point cloud.

4. The positioning method of claim 1, wherein clustering the points in the first point cloud to obtain the second point cloud comprises:
    determining a clustering parameter based on a distribution of the first point cloud; and
    clustering the points in the first point cloud using the clustering parameter to obtain the second point cloud.

5. The positioning method of claim 4, wherein the clustering parameter is at least one of a neighborhood or a minimum quantity of points.

6. The positioning method of claim 1, wherein before clustering the points in the first point cloud through multi-clustering to obtain the target point cloud, the method further comprises extracting the first point cloud from an original point cloud, wherein each point in the original point cloud corresponds to one pixel in an original image, wherein first pixels in the original image corresponding to the points in the first point cloud are within a target boundary of the original image, wherein second pixels in the original image corresponding to points other than the first point cloud in the original point cloud are not within the target boundary, and wherein an image of the target object is within the target boundary.

7. The positioning method of claim 6, wherein extracting the first point cloud from the original point cloud comprises:
    determining the target boundary in the original image; and
    extracting the first point cloud from the original point cloud based on the target boundary.

8. The positioning method of claim 1, further comprising:
    obtaining, based on the position of the target object, a target driving operation for performance by the self-driving apparatus; and
    sending a control instruction to the self-driving apparatus that instructs the self-driving apparatus to perform the target driving operation.

9. A positioning apparatus, comprising:
    a non-transitory storage medium configured to store program instructions; and
    a processor coupled to the non-transitory storage medium and configured to execute the program instructions that cause the positioning apparatus to:
        cluster points in a first point cloud through multi-clustering to obtain a second point cloud, wherein the second point cloud has a highest probability among the first point cloud of belonging to a target cloud based on an average distance between the first point cloud and a centroid of the second point cloud according to a moving coordinate system of a self-driving apparatus, wherein the target point cloud represents a surface feature of a target object, and wherein the first point cloud comprises the target point cloud and another point cloud that represents a surface feature of an interfering object;
        cluster points in a third point cloud at least once to obtain the target point cloud when the second point cloud is not the target point cloud, wherein the third point cloud is not the second point cloud; and
        determine a position of the target object based on the target point cloud.

10. The positioning apparatus of claim 9, wherein the program instructions further cause the positioning apparatus to:
    cluster the points in the third point cloud to obtain a fourth point cloud, wherein the fourth point cloud has the highest probability of belonging to the target point cloud and that is in the plurality of point clouds; and
    cluster points in a fifth point cloud at least once to obtain the target point cloud when the fourth point cloud is not the target point cloud, a quantity of clustering operations is less than a first threshold, and a quantity of points in a fifth point cloud is not less than a second threshold, wherein the fifth point cloud is other than the fourth point cloud in the third point cloud.

11. The positioning apparatus of claim 9, wherein the program instructions further cause the positioning apparatus to extract points other than the second point cloud in the first point cloud to obtain the third point cloud.

12. The positioning apparatus of claim 9, wherein the program instructions further cause the positioning apparatus to:
   determine a clustering parameter based on distribution of the first point cloud; and
   cluster the points in the first point cloud using the clustering parameter, to obtain the second point cloud.

13. The positioning apparatus of claim 12, wherein the clustering parameter is at least one of a neighborhood and a minimum quantity of points.

14. The positioning apparatus of claim 9, wherein the program instructions further cause the positioning apparatus to extract the first point cloud from an original point cloud, wherein each point in the original point cloud corresponds to one pixel in an original image, wherein first pixels in the original image corresponding to the points in the first point cloud are within a target boundary of the original image, wherein second pixels in the original image corresponding to points other than the first point cloud in the original point cloud are not within the target boundary, and wherein an image of the target object is within the target boundary.

15. The positioning apparatus of claim 14, wherein the program instructions further cause the positioning apparatus to:
   determine the target boundary in the original image; and
   extract the first point cloud from the original point cloud based on the target boundary.

16. The positioning apparatus of claim 9, wherein the program instructions further cause the positioning apparatus to:
   obtain, based on the position of the target object, a target driving operation for performance by the self-driving apparatus; and
   send a control instruction to the self-driving apparatus that instructs the self-driving apparatus to perform the target driving operation.

17. A computer program product comprising instructions that are stored on a non-transitory computer readable medium and that when executed by a processor, causes an apparatus to:
   cluster points in a first point cloud through multi-clustering to obtain a second point cloud, wherein the second point cloud has a highest probability among the first point cloud of belonging to a target point cloud based on an average distance between the first point cloud and a centroid of the second point cloud according to a moving coordinate system of a self-driving apparatus, wherein the target point cloud represents a surface feature of a target object, and wherein the first point cloud comprises the target point cloud and another point cloud that represents a surface feature of an interfering object;
   cluster points in a third point cloud at least once to obtain the target point cloud when the second point cloud is not the target point cloud, wherein the third point cloud is not the second point cloud; and
   determine a position of the target object based on the target point cloud.

18. The computer program product of claim 17, wherein before clustering the points in a first point cloud through multi-clustering to obtain a target point cloud, the instructions further cause the apparatus to extract the first point cloud from an original point cloud, wherein each point in the original point cloud corresponds to one pixel in an original image, wherein first pixels in the original image corresponding to the points in the first point cloud are within a target boundary of the original image, wherein second pixels in the original image corresponding to points other than the first point cloud in the original point cloud are not within the target boundary, and wherein an image of the target object is within the target boundary.

19. The computer program product of claim 18, wherein the instructions to extract the first point cloud from the original point cloud further causes the apparatus to:
   determine the target boundary in the original image; and
   extract the first point cloud from the original point cloud based on the target boundary.

20. The computer program product of claim 18, wherein the instructions to cluster the points in the third point cloud at least once to obtain the target point cloud further cause the apparatus to:
   cluster the points in the third point cloud to obtain a fourth point cloud, wherein the fourth point cloud has the highest probability, among the point clouds, of belonging to the target point cloud; and
   cluster points in a fifth point cloud at least once to obtain the target point cloud when the fourth point cloud is not the target point cloud, a quantity of clustering operations is less than a first threshold, and a quantity of points in a fifth point cloud is not less than a second threshold, wherein the fifth point cloud is other than the fourth point cloud in the third point cloud.

21. The computer program product of claim 18, wherein the instructions further cause the apparatus to extract points other than the second point cloud in the first point cloud to obtain the third point cloud.

22. The computer program product of claim 18, wherein the instructions to cluster the points in the first point cloud to obtain the second point cloud further cause the apparatus to:
   determine a clustering parameter based on a distribution of the first point cloud; and
   cluster the points in the first point cloud using the clustering parameter to obtain the second point cloud.

23. The computer program product of claim 17, wherein the instructions that when executed by the processor further causes the apparatus to:
   obtain, based on the position of the target object, a target driving operation for performance by the self-driving apparatus; and
   send a control instruction to the self-driving apparatus that instructs the self-driving apparatus to perform the target driving operation.

* * * * *